United States Patent [19]

Tanihira et al.

[11] Patent Number: 5,553,010
[45] Date of Patent: Sep. 3, 1996

[54] DATA SHIFTING CIRCUIT CAPABLE OF AN ORIGINAL DATA WIDTH ROTATION AND A DOUBLE DATA WIDTH ROTATION

[75] Inventors: Hisamitsu Tanihira; Kazuo Nagahori; Renri Nakano, all of Kawasaki, Japan

[73] Assignee: Fujitsu Limited, Kawasaki, Japan

[21] Appl. No.: 847,315

[22] Filed: Mar. 6, 1992

[30] Foreign Application Priority Data

Mar. 6, 1991 [JP] Japan .................. 3-040298

[51] Int. Cl.$^6$ ................................ G06F 7/00
[52] U.S. Cl. ............. 364/715.08; 395/800; 364/715.01; 364/754; 364/757
[58] Field of Search ............ 364/715.01, 715.08, 364/754, 757, 715; 395/800

[56] References Cited

U.S. PATENT DOCUMENTS

| | | | |
|---|---|---|---|
| 3,996,566 | 12/1976 | Moran | 340/172.5 |
| 4,411,009 | 10/1983 | Martinson | 377/67 |
| 4,472,788 | 9/1984 | Yamazaki | 364/715.08 |
| 4,488,252 | 12/1984 | Vassar | 364/748 |
| 4,785,393 | 11/1988 | Chu et al. | 395/375 |
| 4,831,571 | 5/1989 | Tokumaru | 364/715.08 |
| 4,839,839 | 6/1989 | Tokumaru et al. | 364/715.08 |
| 5,130,941 | 7/1992 | Kudou | 364/715.08 |
| 5,155,698 | 10/1992 | Niimi | 364/715.08 |

FOREIGN PATENT DOCUMENTS

| | | |
|---|---|---|
| 0234187 | 9/1987 | European Pat. Off. . |
| 2119976 | 11/1983 | United Kingdom . |

OTHER PUBLICATIONS

Japanese Patent Abstract, No. 59–62950, Nippon Denki K.K., vol. 8, No. 169, Apr. 1984.
S. Barrett, "Universal Shifter", IBM Technical Disclosure Bulletin, vol. 26, No. 12, May 1984, pp. 6341–6343.
C. Ronse, "On Rotators and Shifters", Philips Journal of Research, vol. 42, No. 4, Nov. 1987, pp. 451–479.

*Primary Examiner*—Eric Coleman
*Assistant Examiner*—Denise Tran
*Attorney, Agent, or Firm*—Staas & Halsey

[57] ABSTRACT

A data shifting circuit comprises a barrel shifter for shifting by a plurality of bits data having a width twice that of a certain data width, and a data controller for supplying the same data having the certain data width commonly to the most significant bits and the least significant bits of the barrel shifter means.

4 Claims, 23 Drawing Sheets

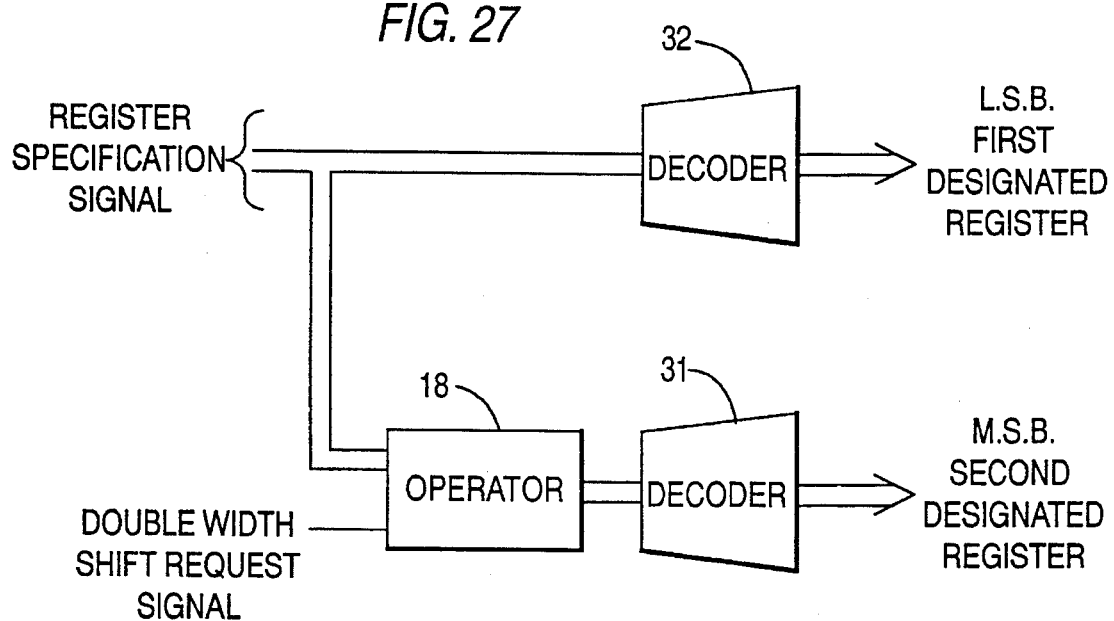

5,553,010

DATA SHIFTING CIRCUIT CAPABLE OF AN ORIGINAL DATA WIDTH ROTATION AND A DOUBLE DATA WIDTH ROTATION

BACKGROUND OF THE INVENTION

1. Field of the Invention

This invention pertains to a data shifting circuit of a central processing unit, e.g., for use in a computer.

2. Description of the Related Arts

A central processing unit (hereafter abbreviated as CPU) has a data shifting circuit comprising a shifter and a register file.

FIG. 1 is a block diagram of a conventional data shifting circuit in a CPU comprising a shifter 1, a register file 2, an ALU (Arithmetic and Logical Unit) 3 and an internal bus 4.

In FIG. 1, a register in the register file 2 is selected, and its content is outputted to a port B1 which outputs the contents to the shifter 1. The shifter 1 shifts the received content by a predetermined shift width for output back to the register file 2 through the internal bus 4, which is written into a predetermined register. This concludes a cycle of a shifting operation. Here, a port A1 of the register file 2 is for use in an operation by the ALU 3.

The number of bits handled by a shifter is generally equal to the number of bits handled by the corresponding CPU. For instance, when a CPU processes sixteen (16) bits of data at a time, the shifter also processes sixteen (16) bits at a time. However, to ease software processing, a shifter sometimes requires the double shifting width.

In enabling an original shift width to be doubled, it is necessary to leave the original shifter function "as is", so as to maintain the compatibility with the original shift width. When a shifter originally rotate-shifting sixteen (16) bits is made capable of rotate-shifting thirty-two (32) bits by doubling the shift width, for instance, if it sacrifices its function of rotate-shifting sixteen (16) bits, the shifter loses its original function.

To overcome this problem, a prior art method has called for a provision of two shifters, one for the original shift width and the other for the double shift width.

However, the use of two shifters necessitates a larger hardware volume, which hinders practical application, especially when a CPU handles a word having a large number of bits.

SUMMARY OF THE INVENTION

This invention concerns a data shifting circuit of a central processing unit e.g. for use in a computer.

The present invention realizes a data shifting circuit, of a central processing unit, capable of shifting data both by an original shift width and by a double shift width, with neither a significantly larger hardware volume nor an increase in data delay.

The present invention configures a data shifting circuit of a central processing unit comprising a shifter, a register group and a data controller.

The shifter may shift data by the bit number of a double shift width. The double shift width is twice as wide as an original shift width.

The register group comprises a plurality of registers each storing data to be shifted.

The data controller, inserted between the register group and the shifter, receives a register number specification signal designating a register and selectively receives a double width shift request signal requesting data be shifted by the double shift width. When the data shifting circuit needs to shift data by the double shift width, the data controller inputs data stored in the specified register and data stored in another register associated with the specified register in a predetermined relation respectively to the most significant bits and the least significant bits of the shifter.

BRIEF DESCRIPTION OF THE DRAWINGS

Those skilled in the art can easily understand additional features and objects of this invention from the description of the preferred embodiments and the illustration of the attached drawings.

In the drawings:

FIG. 15 illustrates output data obtained by shifting exemplary input data by a double shift width pursuant to the fifth embodiment of this invention;

FIG. 16 illustrates output data obtained by shifting exemplary input data by a single shift width pursuant to the fifth embodiment of this invention;

FIG. 21 illustrates output data obtained by shifting exemplary input data by a single shift width pursuant to the sixth embodiment of this invention;

FIG. 27 is a block diagram of a register specifying circuit;

DESCRIPTION OF THE PREFERRED EMBODIMENTS

Figure 1:
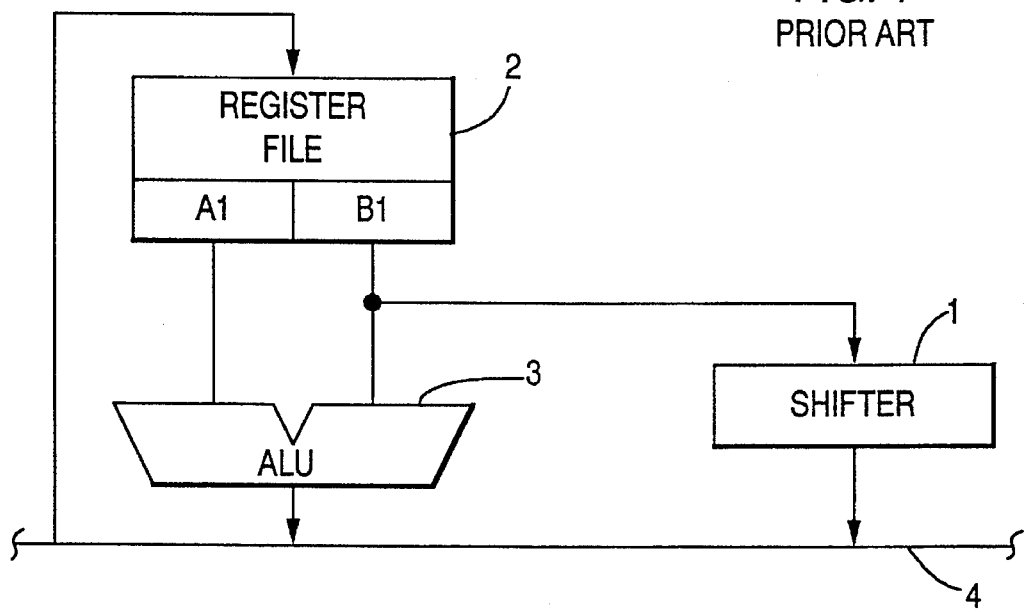
FIG. 1 (Prior Art) is a block diagram of a conventional data shifting circuit in a CPU.
Figure 2:
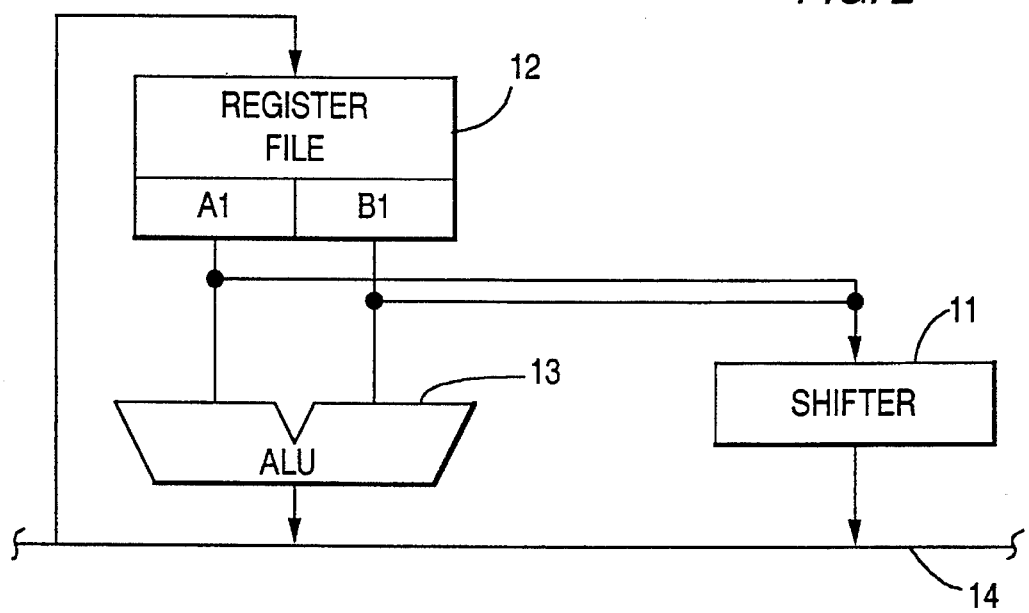
FIG. 2 is a block diagram of a first embodiment of this invention.

FIG. 2 is a block diagram of a first embodiment of this invention.

Figure 3:
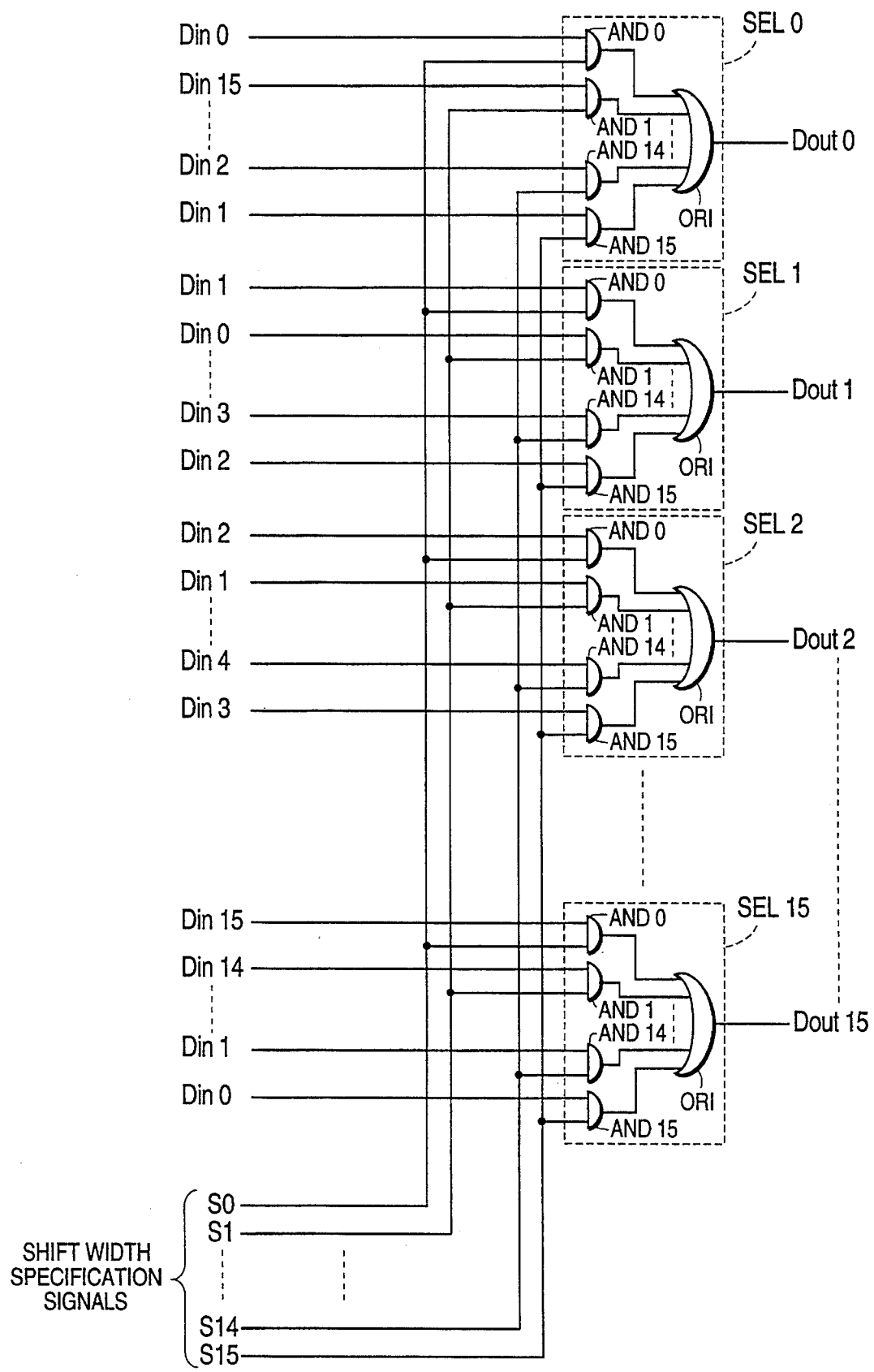
FIG. 3 shows the configuration of a barrel shifter.

In the first embodiment shown in FIGS. 2 and 3, one (1) word comprises eight (8) bits.

On receiving a request to shift data by a double shift width, a controller, not shown, instructs the contents of the two (2) registers specified by a shift request to be output to ports A2 and B2 in a register file 12.

A shifter 11, having the double shift width of two (2) registers, receives the contents of those two (2) registers, and outputs in two (2) sections a result obtained by rotate-shifting data by the double shift width through an internal bus 14 to the two (2) specified registers in the register file 12 for storage.

On receiving a request to shift data by a single shift width, which is an original shift width of one (1) register, the controller, not shown, instructs the contents of one (1) register, specified by the shift request, to be outputted twice to ports A2 and B2 in the register file 12. As a result, the same data are outputted from the ports A2 and B2 to the shifter 11 to be rotate-shifted by a single shift width.

More specifically, because the shifter 11 receives the same two (2) data, the shifter 11 outputs the same rotate-shifted data. When the ports A2 and B2 each supply eight (8) bit data comprising D7, D6, D5, D4, D3, D2, D1 and D0, for example, the shifter 11 receives sixteen (16) bit data comprising D7, D6, D5, D4, D3, D2, D1 and D0. If the shifter 11 rotate-shifts the received data by two (2) bits, for example, the shifter 11 outputs D5, D4, D3, D2, D1, D0, D7, D6, D5, D4, D3, D2, D1, D0, D7 and D6. Although the sixteen (16) bit data are of the double shift width, i.e., the width of two (2) words, the shifter 11 can shift data by the single shift width, i.e., the width of one (1) word, through an output of the same two (2) sets of data, each of eight (8) bits comprising D5, D4, D3, D2, D1, D0, D7, and D6, split from the rotate-shifted result into two (2) halves. The shifter outputs them through the internal bus 14 to a specified register in the register file 12.

Those operations selectively performed by a CPU enable the data to be shifted both by the double shift width and by the single shift width.

The CPU comprises an ALU 13 whose two (2) input ports are respectively connected to the ports A2 and B2 of the register file 12. On receiving an arithmetic or logical operation request, the ports A2 and B2 output data. The ALU 13 performs the arithmetic or logical operation on the two (2) received sets of data. Then, the ALU 13 stores data obtained as the operation result in a target register through the internal bus 14.

FIG. 3 shows the configuration of a barrel shifter.

The shifter 11 operates, mutatis mutandis, like a conventional barrel shifter. When, for example, each register shift data comprises eight (8) bits, 16/1 selectors SEL0 through SEL15 (each with sixteen (16) inputs and one (1) output) configure a sixteen (16) bit barrel shifter having the double shift width. Each of the 16/1 selectors SEL0 through SEL15 has sixteen (16) AND gates, AND0 through AND15, and one (1) OR gate OR1. Each of the sixteen (16) AND gates, AND0 through AND15, receives one of a plurality of specifying the shift width, S0 through S15, at one input terminal and a corresponding one of sixteen (16) bit data, Din0 through Din15. The OR gate OR1 obtains the disjunction of the respective outputs from the sixteen (16) AND gates, AND0 through AND15. The sixteen (16) 16/1 selectors, SEL0 through SEL15, respectively, output shift data, Dout0 through Dout15.

The above procedure enables shifting data by the double shift width, in addition to shifting data by the single shift width, as in a conventional CPU.

This invention causes a shifter to rotate-shift the total data combined from data in the most significant bits and different data in the least significant bits, when data are rotate-shifted by a double shift width twice that of the original shift width. Additionally, the present invention also causes a shifter to rotate-shift data combined from data in the most significant bits and identical data in the least significant bits, when data are rotate-shifted by a single shift width equal to the original shift width. Thus, the present invention realizes a data shifting circuit in a CPU capable of allowing data to be shifted both by the double shift width and the single shift width, without incurring a significantly larger hardware volume or any increase in data delay.

Figure 4:
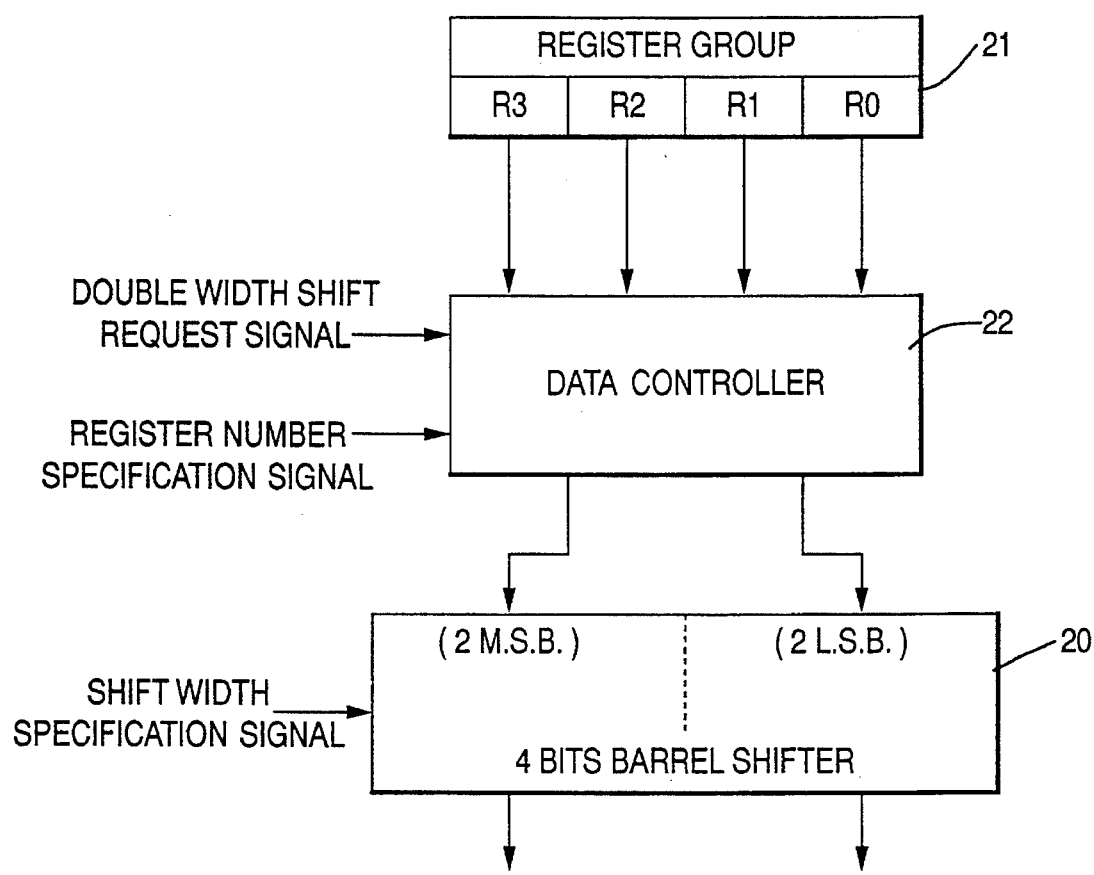
FIG. 4 is a block diagram of a second embodiment of this invention.

FIG. 4 is a block diagram of a second embodiment of this invention.

The second embodiment, shown in FIG. 4, assumes that one (1) word comprises two (2) bits.

A conventional four (4) bit left barrel shifter 20 shifts data sequentially to the left, by the shift width designated by a shift width specification signal and the data overflowing from the left hand side are returned sequentially to the right, thereby rotate-shifting the stored data.

A register group 21 comprises four (4) registers $R_0$, $R_1$, $R_2$ and $R_3$, each storing two (2) bits.

A data controller 22 receives a register number specification signal and a double shift width shift request signal, which govern the selection of the output from one of the four (4) registers $R_0$, $R_1$, $R_2$ and $R_3$ and input, from the data controller, into the two (2) most significant bits or the two (2) least significant bits of the barrel shifter 20.

On receipt of the double shift width shift request signal, the data controller 22 selects the register input corresponding to a register number specified by a register number specification signal. Additionally, the data controller selects the register input corresponding to the specified register number incremented by one(1). For instance, when the register number specification signal designates register $R_0$, the data controller 22 selects both register $R_0$ and register $R_1$. Then, the data controller 22 inputs the two (2) bit data stored in register $R_0$ to the two (2) most significant bits of the barrel shifter 20. The data controller 22 also inputs the two (2) bit data stored to register $R_1$ in the two (2) least significant bits of the barrel shifter 20. Thus, the data controller 22 enables the barrel shifter 20 to obtain four (4) bit rotate-shifted data.

On the other hand, when the data controller 22 does not receive the double shift width shift request signal, causing the barrel shifter 20 to rotate-shift the data by a single shift width, i.e., the original data width of two (2) bits, both the two (2) most significant bits and the two (2) least significant bits of the barrel shifter 20 store the identical two (2) bit data from the register corresponding to the register number specified by the register number specification signal. Thus, two (2) bit data are rotate-shifted just by simply taking either the two (2) most significant bits or the two (2) least significant bits.

As described above, the same data content of one (1) register will be stored twice, once in the most significant bits and once in the least significant bits of a barrel shifter, when a single shift width rotate-shifting is requested. Alternately, the different data contents of two (2) registers will be stored respectively in the most significant bits and the least significant bits of a barrel shifter when a double shift width shift is requested. This invention, therefore, enables a conventional double shift width barrel shifter to rotate-shift the data both by the double shift width and by the single shift width without incurring a significantly larger hardware volume or any increase in data delay.

Figure 5:
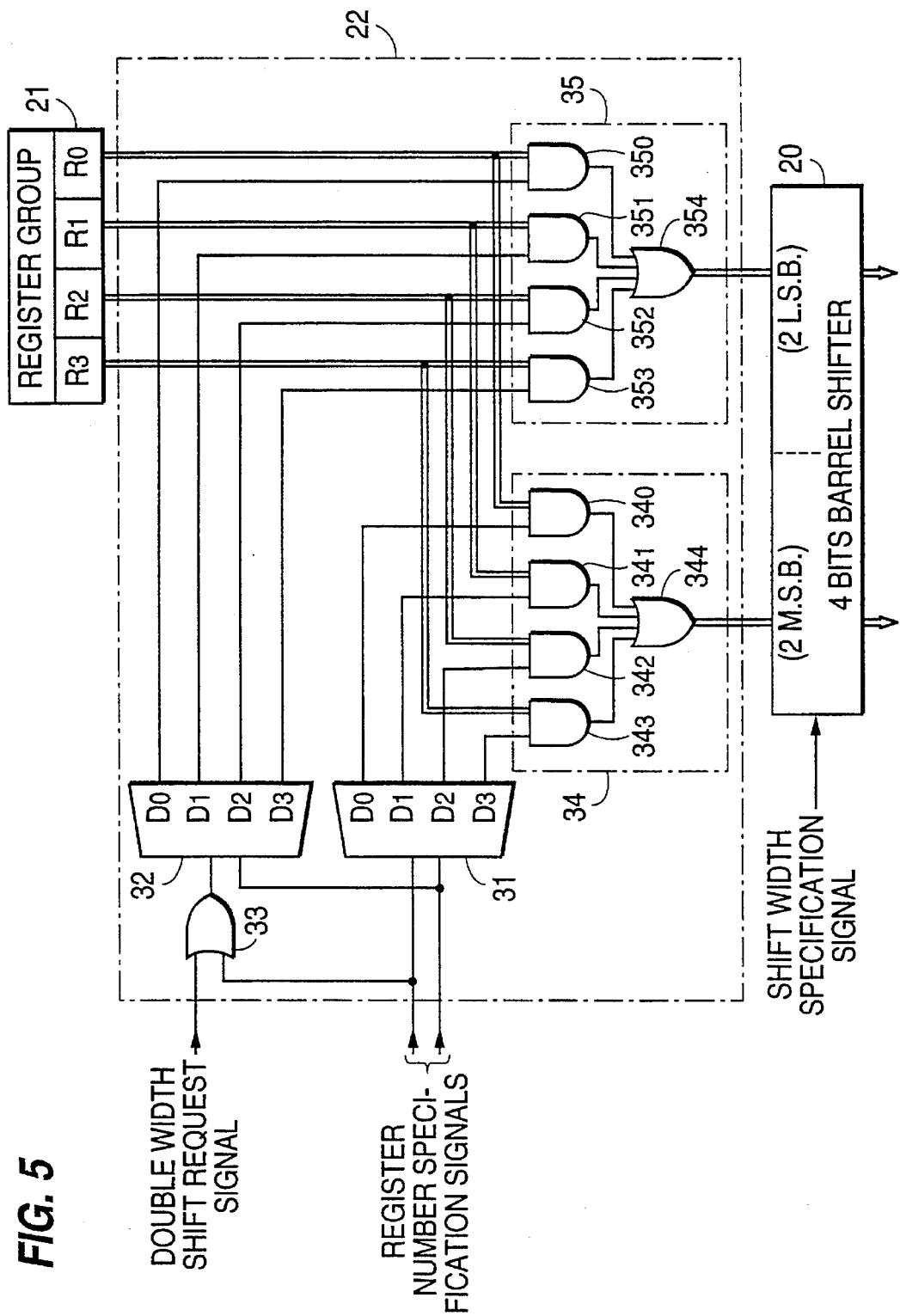
FIG. 5 is a block diagram of a third embodiment of this invention.

FIG. 5 is a block diagram of a third embodiment of this invention.

The third embodiment, shown in FIG. 5, assumes that one (1) word comprises two (2) bits.

The parts shown in FIG. 5 which are the same as those shown in FIG. 4 have the same numbers. Thus, their re-explanations are omitted.

In the third embodiment, the conventional four (4) bit left barrel shifter 20 is used for rotate-shifting data both by the single shift width (i.e., by two (2) bits, the original data shift width), and by the double shift width (i.e., by four (4) bits).

In FIG. 5, 31 is a first decoder, and 32 is a second decoder. The first decoder 31 receives the two (2) bit register number specification signal for selectively specifying one (1) of the four (4) registers $R_0$, $R_1$, $R_2$ and $R_3$. On receiving the two (2) bit register number specification signal, the first decoder 31 decodes the register number specification signal, and sets to a high level the output level of the corresponding output terminal of its output terminals $D_0$, $D_1$, $D_2$ and $D_3$. For instance, on receiving a signal designating register $R_0$, the first decoder 31 sets to a high level the output level of output terminal $D_0$ and to low levels the output levels of its output terminals $D_1$, $D_2$ and $D_3$.

The second decoder 32 receives the most significant bit of the register number specification signal, as well as a disjunctive output from an OR gate 33, which receives the least significant bit of the register number specification signal and the double width shift request signal.

When no request is made to shift data by the double shift width, the OR gate 33 receives a double width shift request signal at a low level, and outputs the least significant bit of the register number specification signal "as is". Because the second decoder 32 also receives "as is" the most significant bit of the register number specification signal, the second decoder 32 sets to a high level the output level of the output terminal connected to the same one of the registers $R_0$, $R_1$, $R_2$ and $R_3$ connected to the output terminal to whose output level the first decoder 31 sets the high level. For instance, on receiving a register number specification signal designating register $R_0$, the second decoder 32 sets to a high level its output terminal $D_0$.

When a request is made to shift data by the double shift width, OR gate 33 receives a double width shift request signal at a high level, and sets to a high level the least significant bit of the register number specification signal. The second decoder 32 outputs a signal designating the register having the register number equal to the register number designated by the register number specification signal incremented by one (1). When the register number specification signal designates register $R_0$, the second decoder 32 increments the register number of register $R_0$ by one (1), and sets to a high level its output terminal $D_1$, such that register $R_1$ is selected.

The third embodiment of this invention implicitly assumes that one of the registers having even numbers is designated to shift data by the double shift width. Hence, the least significant bit of the register number specification signal is at a low level for shifting data by the double shift width, and the first decoder 31 selects such one of the registers having even numbers. Because the second decoder 32 receives a signal converted by OR gate 33, such that the least significant bit of the register number specification signal is at a high level, the second decoder 32 selects the register having the register number incremented by one (1), as a result.

Each of the output terminals $D_0$, $D_1$, $D_2$ and $D_3$ of the first decoder 31 is connected to one of the input terminals of a corresponding one of AND gates $34_0$, $34_1$, $34_2$ and $34_3$ in a first gate circuit module 34. Moreover, each of the output terminals $D_0$, $D_1$, $D_2$ and $D_3$ of the second decoder 32 is connected to one of the input terminals of a corresponding one of AND gates $35_0$, $35_1$, $35_2$ and $35_3$ in a second gate circuit module 35.

Each of the AND gates $34_0$, $34_1$, $34_2$, $34_3$, $35_0$, $35_1$, $35_2$ and $35_3$, receives, at the other one of its input terminals, the two (2) bit data from the corresponding one of registers $R_0$, $R_1$, $R_2$ and $R_3$. That is, the same two (2) bit data stored in register $R_0$ is supplied to AND gates $34_0$ and $35_0$, the same two (2) bit data stored in register $R_1$ is supplied to AND gates $34_1$ and $35_1$, the same two (2) bit data stored in register $R_2$ is supplied to AND gates $34_2$ and $35_2$, and the same two (2) bit data stored in register $R_3$ is supplied to AND gates $34_3$ and $35_3$.

The barrel shifter 20 receives, at its two (2) most significant bits, a disjunctive output from OR gate $34_4$ supplied with conjunctive outputs from AND gates $34_0$, $34_1$, $34_2$ and $34_3$. Additionally, the barrel shifter 20 receives, at its two (2) least significant bits, a disjunctive output from OR gate $35_4$ supplied with conjunctive outputs from AND gates $35_0$, $35_1$, $35_2$ and $35_3$.

The operations for rotate-shifting data by the double shift width, which is four (4) bits (i.e., twice as wide as the original data width of two (2) bits), with a configuration as described above, are explained first. In this case, OR gate 33 receives, at one of its input terminals, the double width shift request signal at the high level.

Assume the register number specification signal designates register $R_0$, for example. Both the first decoder 31, at one input terminal, and the OR gate 33, at the other input terminal, receive the register number specification signal.

The first decoder 31 decodes the register number specification signal, and sets to a high level the output level of its output terminal $D_0$. The second decoder 32 receives a signal designating the register corresponding to a register number equal to the register number designated by the register number specification signal incremented by one (1). The second decoder 32 sets to a high level the output level of its output terminal $D_1$, to designate register $R_1$.

As such, the first gate circuit module 34 allows only AND gate $34_0$ to open its output gate, thereby allowing the two (2) bit data stored in register $R_0$ to pass through OR gate $34_4$ to the two (2) most significant bits of the barrel shifter 20. Meanwhile, the second gate circuit module 35 allows only AND gate $35_1$ to open its output gate, thereby allowing the two (2) bit data stored in register $R_1$ to pass through OR gate $35_4$ to the barrel shifter 20 in its two (2) least significant bits.

Accordingly, the barrel shifter 20 inputs the different two (2) bit data stored in registers $R_0$ and $R_1$, respectively, to its two (2) most significant bits and its two (2) least significant bits.

Then, the barrel shifter 20 rotate-shifts data according to the shift width specification signal it receives.

The operations for rotate-shifting data by the single shift width, i.e., the original data width of two (2) bits, with a configuration as described above are now explained. In this case, OR gate 33 does not receive the double width shift request signal.

Assume the register number specification signal designates register $R_0$, for example. The the first decoder 31 and the second decoder 32 decode the register number specification signal each receives, and sets to high levels the output levels of their respective output terminals $D_0$, so as to designate register $R_0$.

As such, the first gate circuit module 34 allows only AND gate $34_0$ to open its output gate, thereby allowing the two (2) bit data stored in register $R_0$ to pass through OR gate $34_4$ to the two (2) most significant bits of the barrel shifter 20. Meanwhile, the second gate circuit module 35 allows only AND gate $35_0$ to open its output gate, thereby allowing the same two (2) bit data stored in register $R_0$ to pass through OR gate $35_4$ to the barrel shifter 20 in its two (2) least significant bits.

Accordingly, the barrel shifter 20 inputs the same two (2) bit data stored in register $R_0$ respectively to its two (2) most significant bits and its two (2) least significant bits. When the two (2) bit data stored in register $R_0$ are "zero (0) and one (1)", for example, the barrel shifter 20 inputs "zero (0) and one (1)" to its two (2) most significant bits and its two (2) least significant bits, thereby producing four (4) bit data "zero (0), one (1), zero (0) and one (1)".

By rotate-shifting the four (4) bit data by one (1) bit to the left, the barrel shifter 20 obtains four (4) bit data "one (1), zero (0), one (1) and one (1)" By further rotate-shifting these four (4) bit data by one (1) more bit to the left, the barrel shifter 20 obtains four (4) bit data "zero (0), one (1), zero (0) and one (1)".

The above explanations for the operations of the barrel shifter 20 can be summarized as follows:

On rotate-shifting data by the double shift width, i.e., by twice as wide as the original data width, which is four (4) bits, the barrel shifter 20 inputs, to its two (2) most significant bits, the data stored in a designated register and, to its two (2) least significant bits, the data stored in a second designated register having the register number equal to the register number of the designated register incremented by one (1).

On rotate-shifting data by the single shift width, i.e., by the original data width of two (2) bits, the barrel shifter 20 inputs to both its two (2) most significant bits and to its two (2) least significant bits, the data stored in a designated register.

Figure 6:
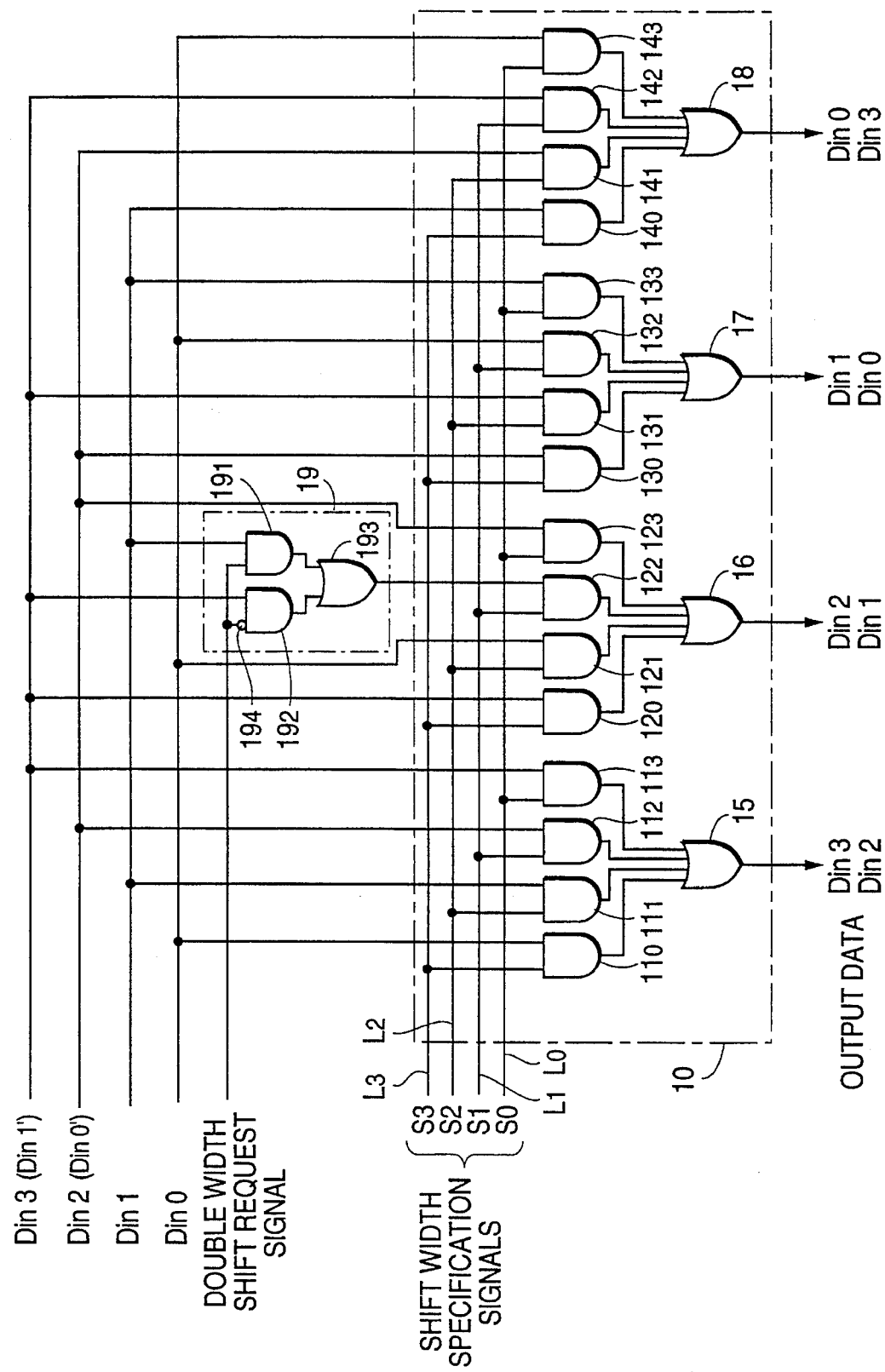
FIG. 6 is a block diagram of a fourth embodiment of this invention.

FIG. 6 is a block diagram of a fourth embodiment of this invention.

The fourth embodiment, shown in FIG. 6, assumes that one (1) word comprises two (2) bits.

A four (4) bit left barrel shifter 10 can selectively perform a two (2) bit left barrel shift or a four (4) bit left barrel shift through the operations of a selector 19. The four (4) bit left barrel shift is explained in a simplistic form, as an example.

By shifting four (4) bit data comprising D3, D2, D1 and D0 by one (1) bit to the left, the barrel shifter 10 obtains four (4) bit data comprising D2, D1, D0 and D3. By further shifting the four (4) bit data comprising D2, D1, D0 and D3 by one (1) more bit to the left, the barrel shifter 10 obtains four (4) bit output data comprising D1, D0, D3 and D2. That is, the barrel shifter 10 shifts the bit data sequentially to the left, with data overflowing from the left margin, circularly re-entering at the right end.

Similar to the barrel shifter configuration shown in FIG. 3, the barrel shifter 10 comprises four (4) gate circuit modules, each comprising four (4) AND gates and one (1) OR gate. More specifically, OR gate 15 receives conjunctive outputs from AND gates $11_0$, $11_1$, $11_2$ and $11_3$; OR gate 16 receives conjunctive outputs from AND gates $12_0$, $12_1$, $12_2$ and $12_3$; OR gate 17 receives conjunctive outputs from AND gates $13_0$, $13_1$, $13_2$ and $13_3$; and OR gate 18 receives conjunctive outputs from AND gates $14_0$, $14_1$, $14_2$ and $14_3$.

The four (4) AND gates, i.e., AND gates $11_0$, $11_1$, $11_2$ and $11_3$, AND gates $12_0$, $12_1$, $12_2$ and $12_3$, AND gates $13_0$, $13_1$, $13_2$ and $13_3$, or AND gates $14_0$, $14_1$, $14_2$ and $14_3$, in each of the four (4) gate circuit modules, each receive a shift width specification signal designating the shift width. More specifically, AND gates $11_3$, $12_3$, $13_3$ and $14_3$ each receive, at one of their input terminals, a shift width specification signal designating a shift width of zero (0) bit through line $L_0$; AND gates $11_2$, $12_2$, $13_2$ and $14_2$ each receive, at one of their input terminals, a shift width specification signal designating a shift width of one (1) bit through line $L_1$; AND gates $11_1$, $12_1$, $13_1$ and $14_1$ each receive, at one of their input terminals, a shift width specification signal designating a shift width of two (2) bits through line $L_2$; and AND gates $11_0$, $12_0$, $13_0$ and $14_0$ each receive, at one of their input terminals, a shift width specification signal designating a shift width of three (3) bits through line $L_3$.

AND gates $11_3$, $12_0$, $13_1$ and $14_2$ each receive, at the other one of their input terminals, a one (1) bit input datum Din3; AND gates $11_2$, $12_3$, $13_0$ and $14_1$ each receive, at the other one of their input terminals, a one (1) bit input datum Din2; AND gates $11_1$, $12_2$, $13_3$ and $14_0$ each receive, at the other one of their input terminals, a one (1) bit input datum Din1; AND gates $11_0$, $12_1$, $13_2$ and $14_3$ each receive, at the other one of their input terminals, a one (1) bit input datum Din0; and AND gate $12_2$ receives at the other one of its input terminals, an input datum selected by the selector 19 from OR gate $19_3$.

The selector 19 comprises two (2) AND gates $19_1$ and $19_2$, an OR gate $19_3$, and an inverter $19_4$. AND gate $19_1$ receives at one of its input terminals one (1) bit input datum Din1. AND gate $19_1$ also receives at the other one of its input terminals a double width shift request signal. AND gate $19_2$ receives through the inverter $19_4$ at one of its input terminals the inverted double width shift request signal.

The double width shift request signal is at a high level when a request is made to shift data by the double shift width. In this case, because the double width shift request signal is at the high level, AND gate $19_2$ in the selector 19 is shut.

When the shift width specification signal designates the shift width of zero (0) bit (i.e., no shift at all), only its supply through line $L_0$ is at a high level, causing the barrel shifter 10 to open AND gates $11_3$, $12_3$, $13_3$ and $14_3$. This allows four (4) bit input data Din3, Din2, Din1 and Din0 to pass, respectively, through OR gates 15, 16, 17 and 18. Accordingly, the barrel shifter 10 outputs the four (4) bit input data Din3, Din2, Din1 and Din0 sequentially from the left.

When the shift width specification signal designates the shift width of one (1) bit (i.e., one (1) bit shift to the left), only its supply through line $L_1$ is at a high level, causing the barrel shifter 10 to open AND gates $11_2$, $12_2$, $13_2$ and $14_2$. AS a result, four (4) bit input data Din2, Din1, Din0 and Din3 may pass, respectively, through OR gates 15, 16, 17 and 18. Accordingly, the barrel shifter 10 outputs the four (4) bit input data Din2, Din1, Din0 and Din3 sequentially from the left. At this time, AND gate $12_2$ outputs through OR gate 16 one (1) bit input datum Din1 it receives through AND gate $19_1$ and OR gate $19_3$ in the selector 19. In this manner, the barrel shifter 10 rotate-shifts data sequentially to the left, and for those data overflowing from the left end circularly to the right end, in accordance with the shift width.

While the above explanation relates to the operations for shifting data by four (4) bits (i.e., by the double shift width), the below explanation relates to the operations for shifting data by two (2) bits (i.e., by the single shift width, which is the original data width). In this case, because input data are also of two (2) bits, the explanation is made by replacing Din2 and Din3, respectively, with Din0' and Din1'.

When the barrel shifter 10 shifts data by two (2) bits, the double width shift request signal is at a low level, causing the selector 19 to close AND gate $19_1$ and open AND gate $19_4$.

When the shift width specification signal designates a shift width of zero (0) bit (i.e., no shift at all), only its supply through line $L_0$ is at a high level. This causes the barrel shifter 10 to open its AND gates $11_3$, $12_3$, $13_3$ and $14_3$, thereby allowing four (4) bit input data Din1', Din0', Din1 and Din0 to pass, respectively, through OR gates 15, 16, 17 and 18. Accordingly, the barrel shifter 10 outputs the four (4) bit input data Din1', Din0', Din1 and Din0 sequentially from the left. At this time, the outputs from OR gates 17 and 18 are not meaningful.

When the shift width specification signal designates a shift width of one (1) bit (i.e., one (1) bit shift to the left), only its supply through line $L_1$ is at a high level. As a result, the barrel shifter 10 opens AND gates $11_2$, $12_2$, $13_2$ and $14_2$, thereby allowing four (4) bit input data Din0', Din1', Din0 and Din1' to pass, respectively, through OR gates 15, 16, 17 and 18. Accordingly, the barrel shifter 10 outputs the four (4) bit input data Din0', Din1', Din0 and Din1' sequentially from the left. Also at this time, the outputs from OR gates 17 and 18 are not meaningful.

Thus, the two (2) most significant bits of the output from the barrel shifter 10 (i.e., outputs from OR gates 15 and 16) reveal that the barrel shifter 10 performs a two (2) bit barrel shift between "Din1' and Din0'" and "Din0' and Din1'".

Hence, operations of the selector 19 enable the barrel shifter 10 to shift data both by the double shift width and by the single shift width.

The first, second and third embodiments of this invention cause the barrel shifter having a double shift width to operate at all times and to receive the same data when shifting data by a single shift width. However, an embodiment of this invention is by no means limited to such a configuration. Instead, in the fourth embodiment, the barrel shifter has a selector for selectively outputting a datum to the targeted bit position when data are shifted by a single shift width.

FIGS. 7 through 16 relate to the configuration of a fifth embodiment of this invention, in which the four (4) least significant bits are output as shift data, when the data are shifted by the single shift width.

The fifth embodiment, shown in FIGS. 7 through 16, assumes that one (1) word comprises four (4) bits.

Shift width specification signals S0, S1, S2, S3, S4, S5, S6 and S7, respectively, specify the shift widths of zero (0) bit, one (1) bit, two (2) bits, three (3) bits, four (4) bits, five (5) bits, six (6) bits, and seven (7) bits for enabling sequentially staggered input data Di0, Di1, Di2, Di3, Di4, Di5, Di6 and Di7 to be selectively outputted as output data Do7, Do6, Do5, Do4, Do3, Do2, Do1 and Do0.

FIGS. 7 through 10 show the circuits for outputting the four (4) most significant bits of output data Do7, Do6, Do5 and Do4, used only in shifting input data by a double shift width (i.e., by eight (8) bits) and not used in shifting input data by a single shift width (i.e., by four (4) bits).

Figure 7:
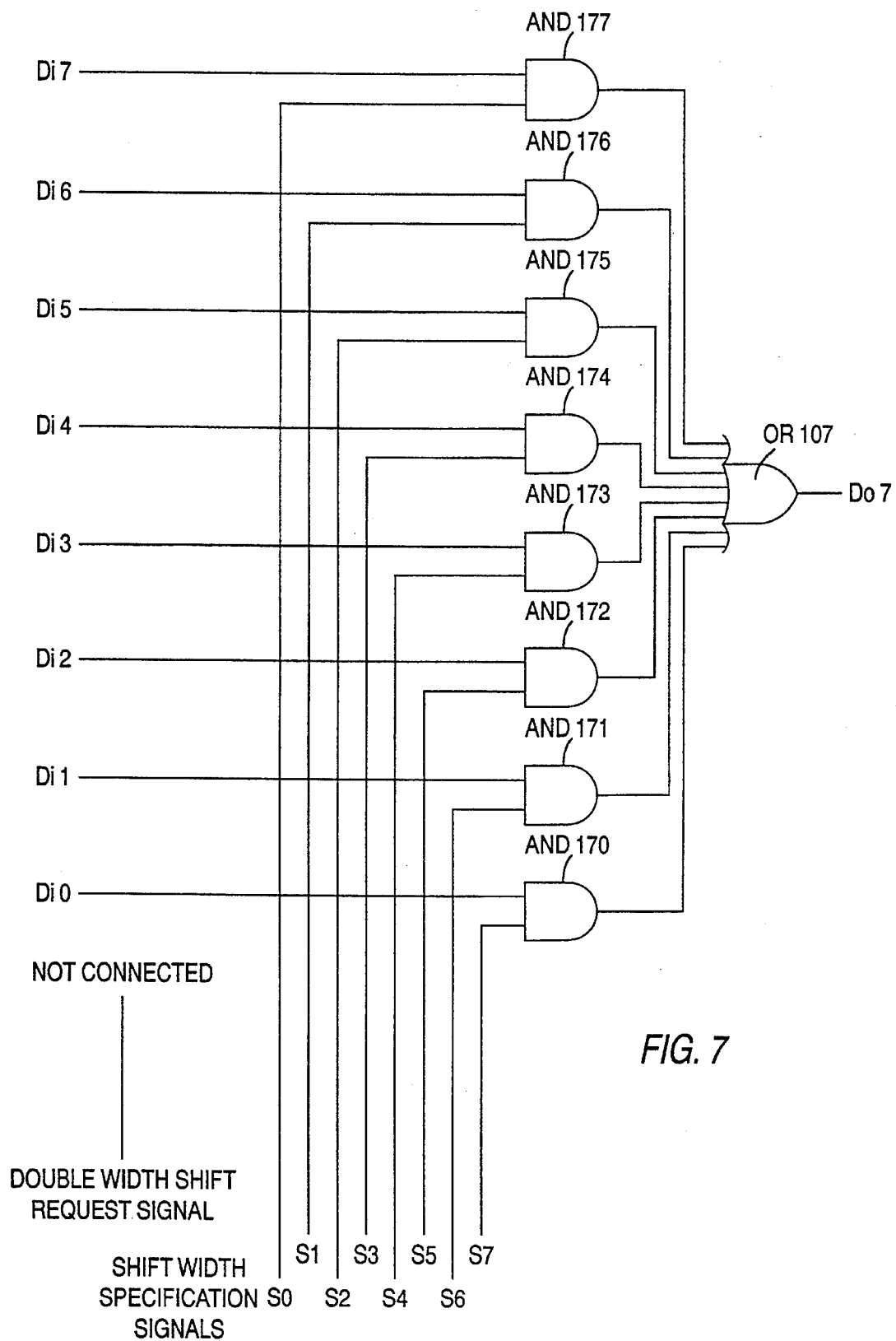
FIG. 7 is the first in an eight (8) part series of detailed circuit diagrams illustrating a fifth embodiment of this invention.

FIG. 7 is the first in an eight (8) part series of detailed circuit diagrams illustrating the fifth embodiment of this invention.

AND gates AND170, AND171, AND172, AND173, AND174, AND175, AND176 and AND177, respectively, receive at one of their input terminals the shift width specification signals S7, S6, S5, S4, S3, S2, S1 and S0; at the other one of their input terminals the input data Di0, Di1, Di2, Di3, Di4, Di5, Di6 and Di7; and supply their conjunctive outputs to an OR gate OR107, which in turn emits a one (1) bit disjunctive output datum Do7.

Only one (1) of the shift width specification signals, S7, S6, S5, S4, S3, S2, S1 and S0, is set at a high level, consequently, only the corresponding one (1) of the AND gates AND170, AND171, AND172, AND173, AND174, AND175, AND176 and AND177, thereby will allow only the corresponding one (1) of the input data Di0, Di1, Di2, Di3, Di4, Di5, Di6 and Di7 to pass through to the OR gate OR107. Since only one (1) of the AND gates AND170, AND171, AND172, AND173, AND174, AND175, AND176 and AND177 is open, while all the others are shut, the OR gate OR107 allows the corresponding one (1) of the input data Di0, Di1, Di2, Di3, Di4, Di5, Di6 and Di7 to be emitted as the output datum Do7 to the first most significant bit.

Figure 8:
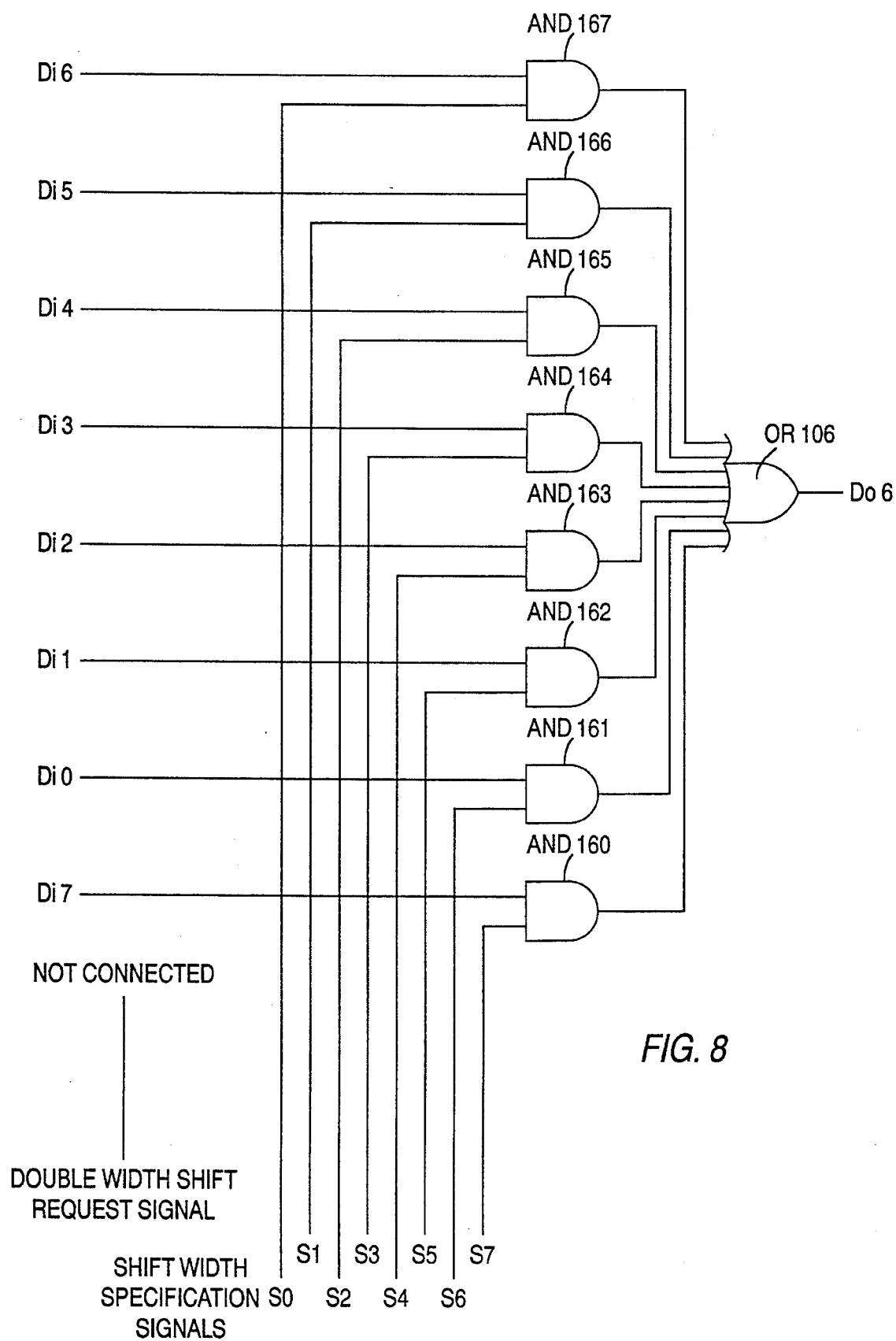
FIG. 8 is the second in the eight (8) part series of detailed circuit diagrams illustrating the fifth embodiment of this invention.

FIG. 8 is the second in the eight (8) part series of detailed circuit diagrams illustrating the fifth embodiment of this invention.

AND gates AND160, AND161, AND162, AND163, AND164, AND165, AND166 and AND167, respectively, receive at one of their input terminals the shift width specification signals, S7, S6, S5, S4, S3, S2, S1 and S0 and at the other one of their input terminals the input data Di7, Di0, Di1, Di2, Di3, Di4, Di5 and Di6, and supply their conjunctive outputs to an OR gate OR106, which in turn emits a one (1) bit disjunctive output datum Do6.

Only one (1) of the shift width specification signals S7, S6, S5, S4, S3, S2, S1 and S0 is at a high level. Therefore, only the corresponding one (1) of the AND gates AND160, AND161, AND162, AND163, AND164, AND165, AND166 and AND167, thereby will allow only the corresponding one (1) of the input data Di7, Di0, Di1, Di2, Di3, Di4, Di5 and Di6 to pass through to the OR gate OR106. Since only one (1) of the AND gates AND160, AND161, AND162, AND163, AND164, AND165, AND166 and AND167 is open, while all the others are shut, the OR gate OR106 allows the corresponding one (1) of the input data Di7, Di0, Di1, Di2, Di3, Di4, Di5 and Di6 to be emitted as the output datum Do6 as the second most significant bit.

Figure 9:
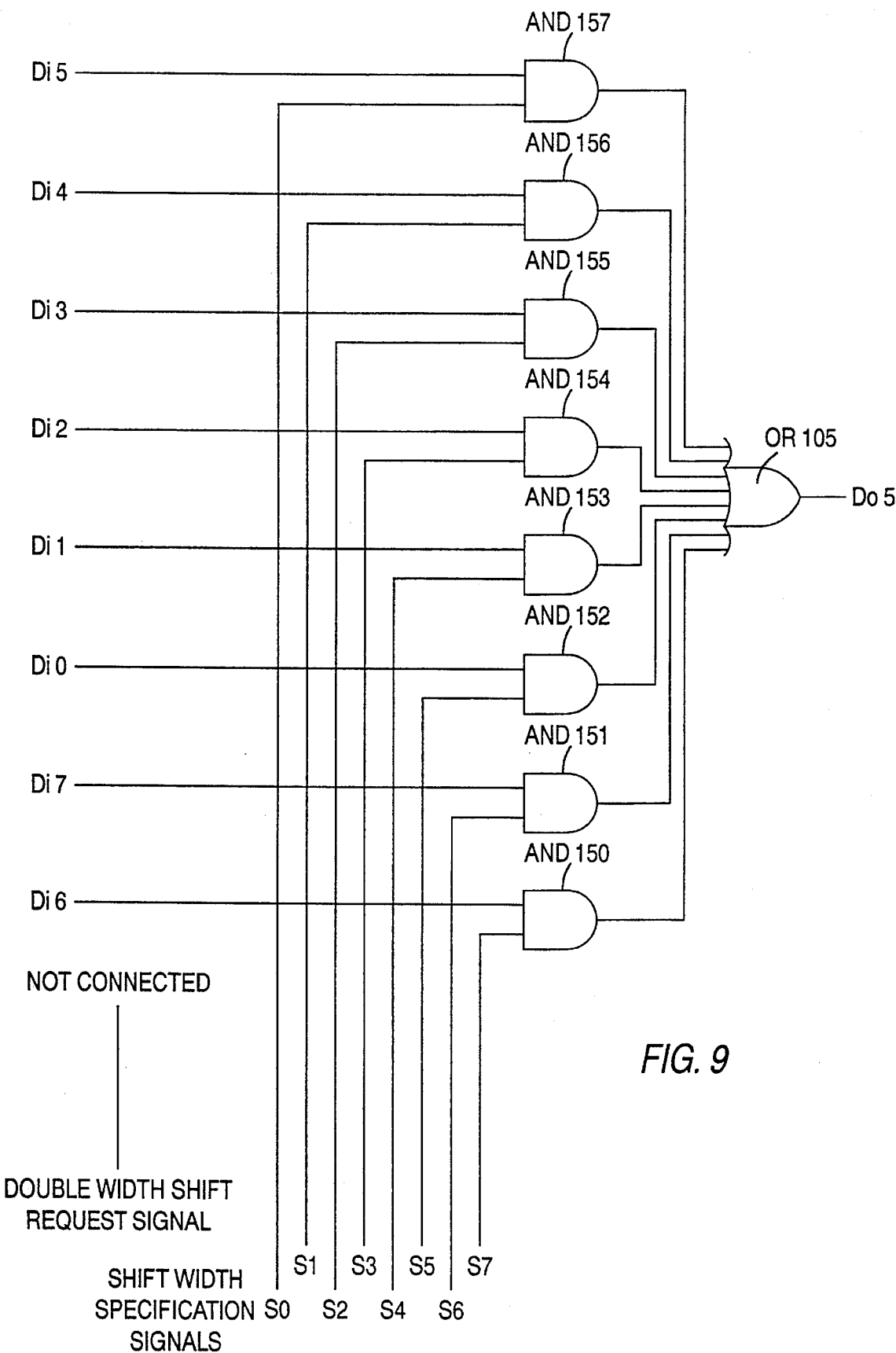
FIG. 9 is the third in the eight (8) part series of detailed circuit diagrams illustrating the fifth embodiment of this invention.

FIG. 9 is the third in the eight (8) part series of detailed circuit diagrams illustrating the fifth embodiment of this invention.

AND gates AND150, AND151, AND152, AND153, AND154, AND155, AND156 and AND157, respectively, receive at one of their input terminals shift width specification signals S7, S6, S5, S4, S3, S2, S1 and S0 and at the other one of their input terminals the input data Di6, Di7, Di0, Di1, Di2, Di3, Di4 and Di5; and supply their conjunctive outputs to an OR gate OR105, which in turn emits a one (1) bit disjunctive output datum Do5.

Only one (1) of the shift width specification signals S7, S6, S5, S4, S3, S2, S1 and S0 is at a high level. Therefore, only the corresponding one (1) of the AND gates AND150, AND151, AND152, AND153, AND154, AND155, AND156 and AND157, thereby will allow only the corresponding one (1) of the input data Di6, Di7, Di0, Di1, Di2, Di3, Di4 and Di5 to pass through to the OR gate OR105. Since only one (1) of the AND gates AND150, AND151, AND152, AND153, AND154, AND155, AND156 and AND157 is open, while all the others are shut, the OR gate OR105 allows the corresponding one (1) of the input data Di6, Di7, Di0, Di1, Di2, Di3, Di4 and Di5 to be emitted as the output datum Do5 as the third most significant bit.

Figure 10:
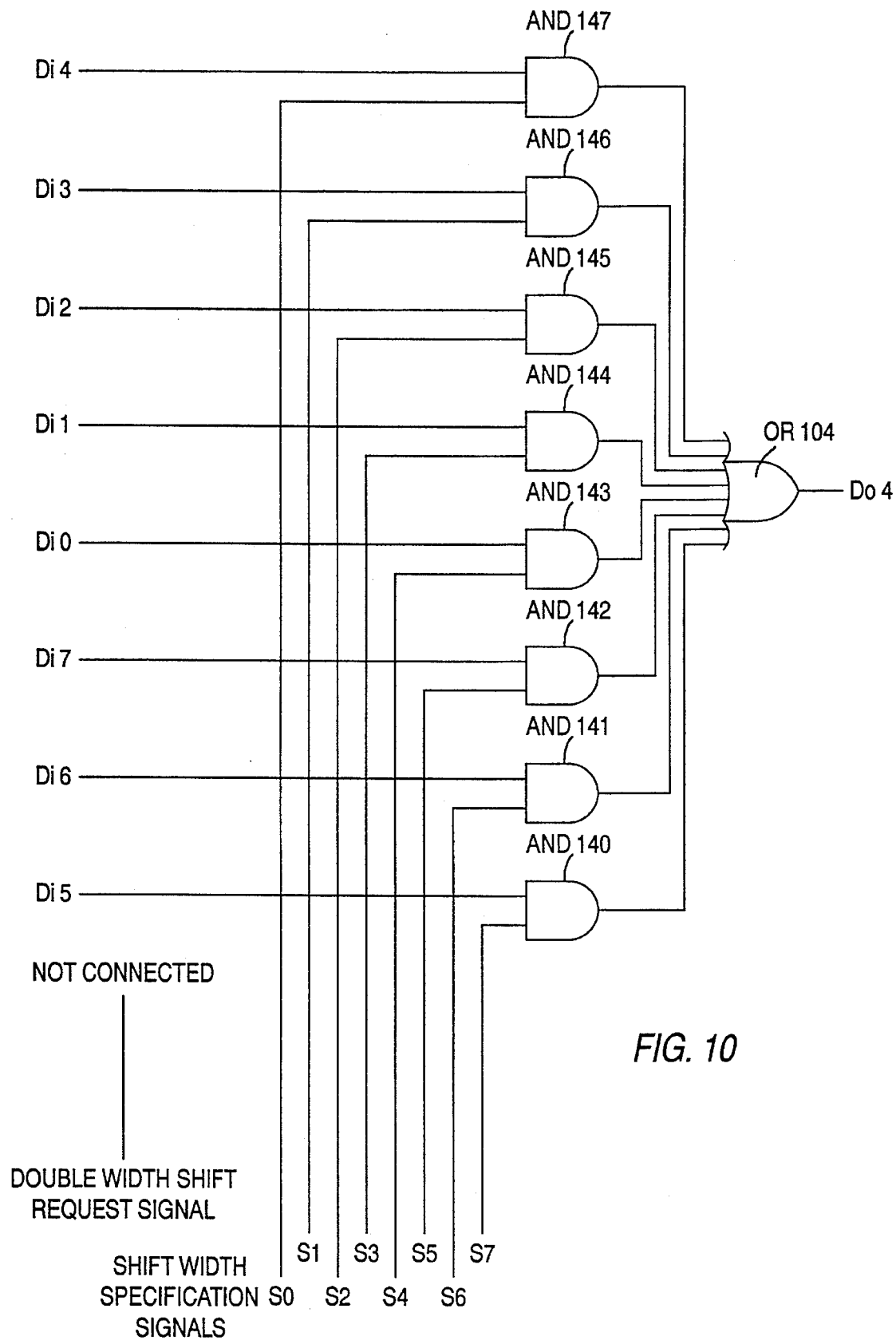
FIG. 10 is the fourth in the eight (8) part series of detailed circuit diagrams illustrating the fifth embodiment of this invention.

FIG. 10 is the fourth in the eight (8) part series of detailed circuit diagrams illustrating the fifth embodiment of this invention.

AND gates AND140, AND141, AND142, AND143, AND144, AND145, AND146 and AND147, respectively, receive at one of their input terminals shift width specification signals S7, S6, S5, S4, S3, S2, S1 and S0 and at the other one of their input terminals the input data Di5, Di6, Di7, Di0, Di1, Di2, Di3 and Di4, and supply their conjunctive outputs to an OR gate OR104, which in turn emits a one (1) bit disjunctive output datum Do4.

Only one (1) of the shift width specification signals S7, S6, S5, S4, S3, S2, S1 and S0 is at a high level. Therefore, only the corresponding one (1) of the AND gates AND140, AND141, AND142, AND143, AND144, AND145, AND146 and AND147, thereby will allow only the corresponding one (1) of the input data Di5, Di6, Di7, Di0, Di1, Di2, Di3 and Di4 to pass through to the OR gate OR104. Since only one (1) of the AND gates AND140, AND141, AND142, AND143, AND144, AND145, AND146 and AND147 is open, while all the others are shut, the OR gate OR104 allows the corresponding one (1) of the input data Di5, Di6, Di7, Di0, Di1, Di2, Di3 and Di4 to be emitted as the output datum Do4 as the fourth most significant bit.

FIGS. 11 through 14 show the circuits for outputting the four (4) least significant bits of output data Do3, Do2, Do1 and Do0.

Figure 11:
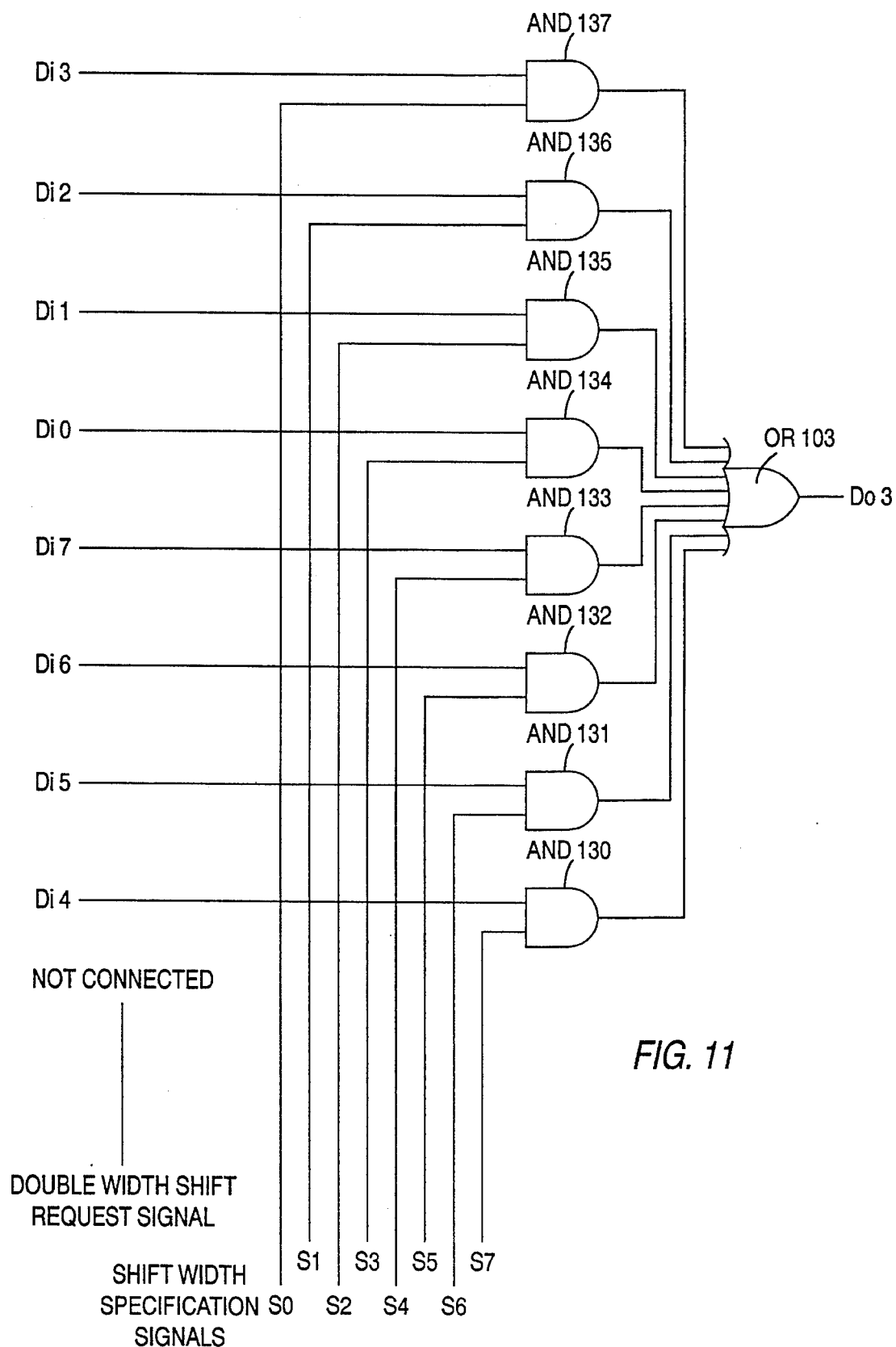
FIG. 11 is the fifth in the eight (8) part series of detailed circuit diagrams illustrating the fifth embodiment of this invention.

FIG. 11 is the fifth in the eight (8) part series of detailed circuit diagrams illustrating the fifth embodiment of this invention.

AND gates AND130, AND131, AND132, AND133, AND134, AND135, AND136 and AND137, respectively, receive at one of their input terminals shift width specification signals S7, S6, S5, S4, S3, S2, S1 and S0 and at the other one of their input terminals the input data Di4, Di5, Di6, Di7, Di0, Di1, Di2 and Di3 and supply their conjunctive outputs to an OR gate OR103, which in turn emits a one (1) bit disjunctive output datum Do3.

Only one (1) of the shift width specification signals S7, S6, S5, S4, S3, S2, S1 and S0 is at a high level. Therefore, only the corresponding one (1) of the AND gates AND130, AND131, AND132, AND133, AND134, AND135, AND136 and AND137, thereby will allow only the corresponding one (1) of the input data Di4, Di5, Di6, Di7, Di0, Di1, Di2 and Di3 to pass through to the OR gate OR103. Since only one (1) of the AND gates AND130, AND131, AND132, AND133, AND134, AND135, AND136 and AND137 is open, while all the others are shut, the OR gate OR103 allows the corresponding one (1) of the input data Di4, Di5, Di6, Di7, Di0, Di1, Di2 and Di3 to be emitted as the output datum Do3 as the fifth most significant bit.

The configuration shown in FIG. 11, in which a double width shift request signal is not connected, is very similar to those shown in FIGS. 7 through 10.

Figure 12:
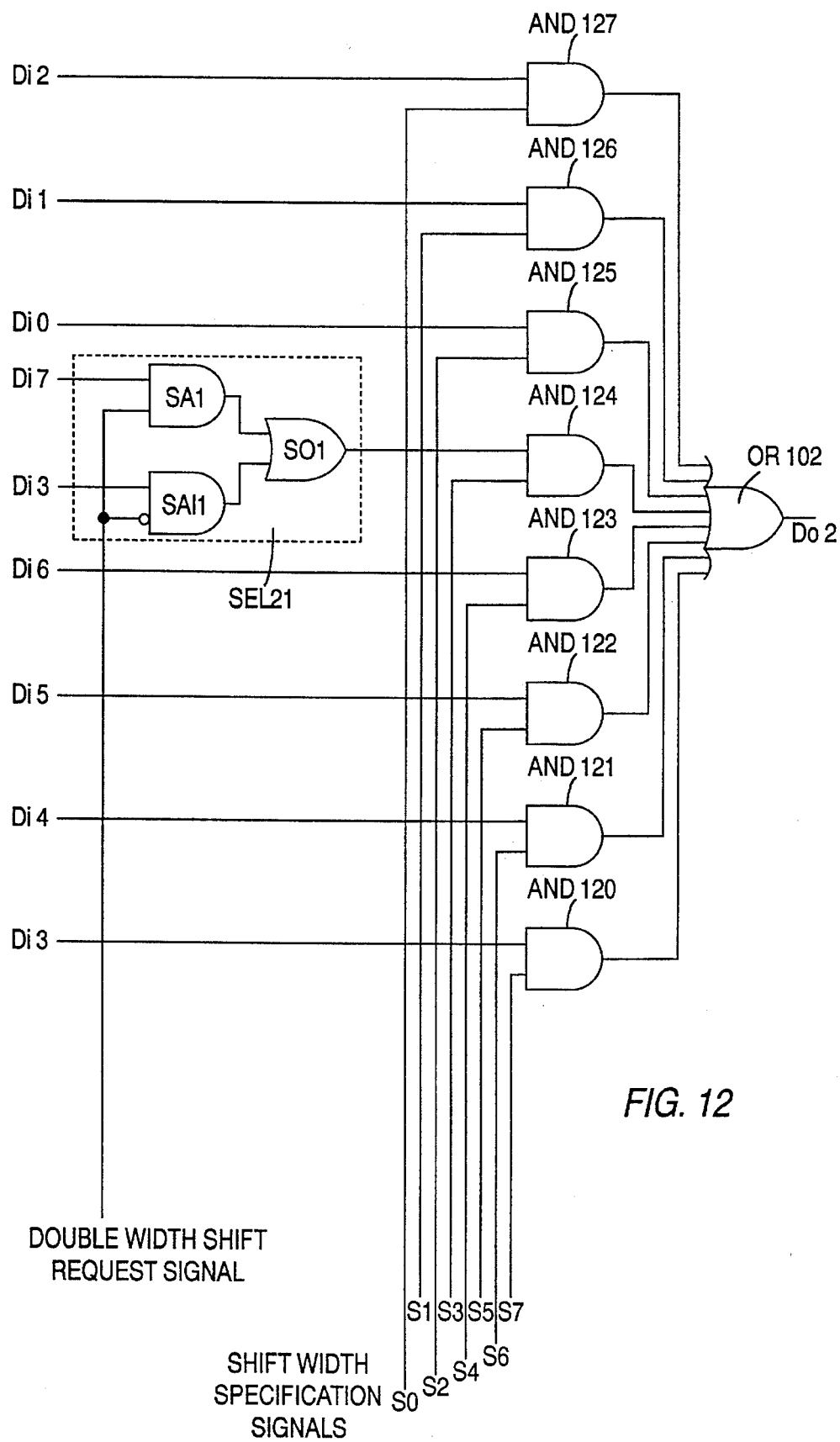
FIG. 12 is the sixth in the eight (8) part series of detailed circuit diagrams illustrating the fifth embodiment of this invention.

FIG. 12 is the sixth in the eight (8) part series of detailed circuit diagrams illustrating the fifth embodiment of this invention.

AND gates AND120, AND121, AND122, AND123, AND124, AND125, AND126 and AND127, respectively, receive at one of their input terminals shift width specification signals S7, S6, S5, S4, S3, S2, S1 and S0 and at the other one of their input terminals four (4) input data Di3, Di4, Di5 and Di6, one (1) output from a selector SEL21, and three (3) input data Di0, Di1 and Di2, and supply their conjunction outputs to an OR gate OR102, which in turn emits a one (1) bit disjunctive output datum Do2.

The selector SEL21 comprises two (2) AND gates SA1 and SAI1, an OR gate SO1 and an inverter attached to an input terminal of AND gate SAI1. OR gate SO1 receives the conjunctive outputs from AND gates SA1 and SAI1 and supplies a disjunctive output to AND gate AND124 as an output from the selector SEL21. AND gate SA1 receives an input datum Di7 at one of its input terminals and a double width shift request signal at the other one of its input terminals. AND gate SA1 receives an input datum Di7 at one of its input terminals and a double width shift request signal at the other one of its input terminals. AND gate SAI1 receives an input datum Di3 at one of its input terminals and the inverted double width shift request signal through the attached inverter at the other one of its input terminals.

Thus, when a request is made to shift data by the double shift width, the selector SEL21 outputs input datum Di7 from OR gate SO1, because the double width shift request signal at a high level allows AND gate SA1 to open, while the inverted double width shift request signal at a low level disallows AND gate SA1 to open.

Also, when a request is not made to shift data by the double shift width, the selector SEL21 outputs input datum Di3 from OR gate SO1, because the double width shift request signal at a low level disallows AND gate SA1 to open, while the inverted double width shift request signal at a high level allows AND gate SAI1 to open.

Only one (1) of the shift width specification signals S7, S6, S5, S4, S3, S2, S1 and S0 is at a high level. Therefore, only the corresponding one (1) of the AND gates AND120, AND121, AND122, AND123, AND124, AND125, AND126 and AND127, thereby will allow only the corresponding one (1) of the input data Di3, Di4, Di5, Di6, Di7 or Di3, Di0, Di1 and Di2 to pass through to OR gate OR102. Since only one (1) of the AND gates AND120, AND121, AND122, AND123, AND124, AND125, AND126 and AND127 is open, while all the other are shut, OR gate OR102 allows the corresponding one (1) of the input data Di3, Di4, Di5, Di6, Di7 or Di3, Di0, Di1 and Di2 to be emitted as the output datum Do2 as the sixth most significant bit.

That is, when the shift width specification signal S3 specifies the shift width of three (3) bits, the output datum Do2 is different if the input data are shifted by the double shift width than if they are shifted by the single shift width. Thus, the selector SEL21 selects either input datum Di3 or input datum Di7 according to the double width shift request signal.

Figure 13:
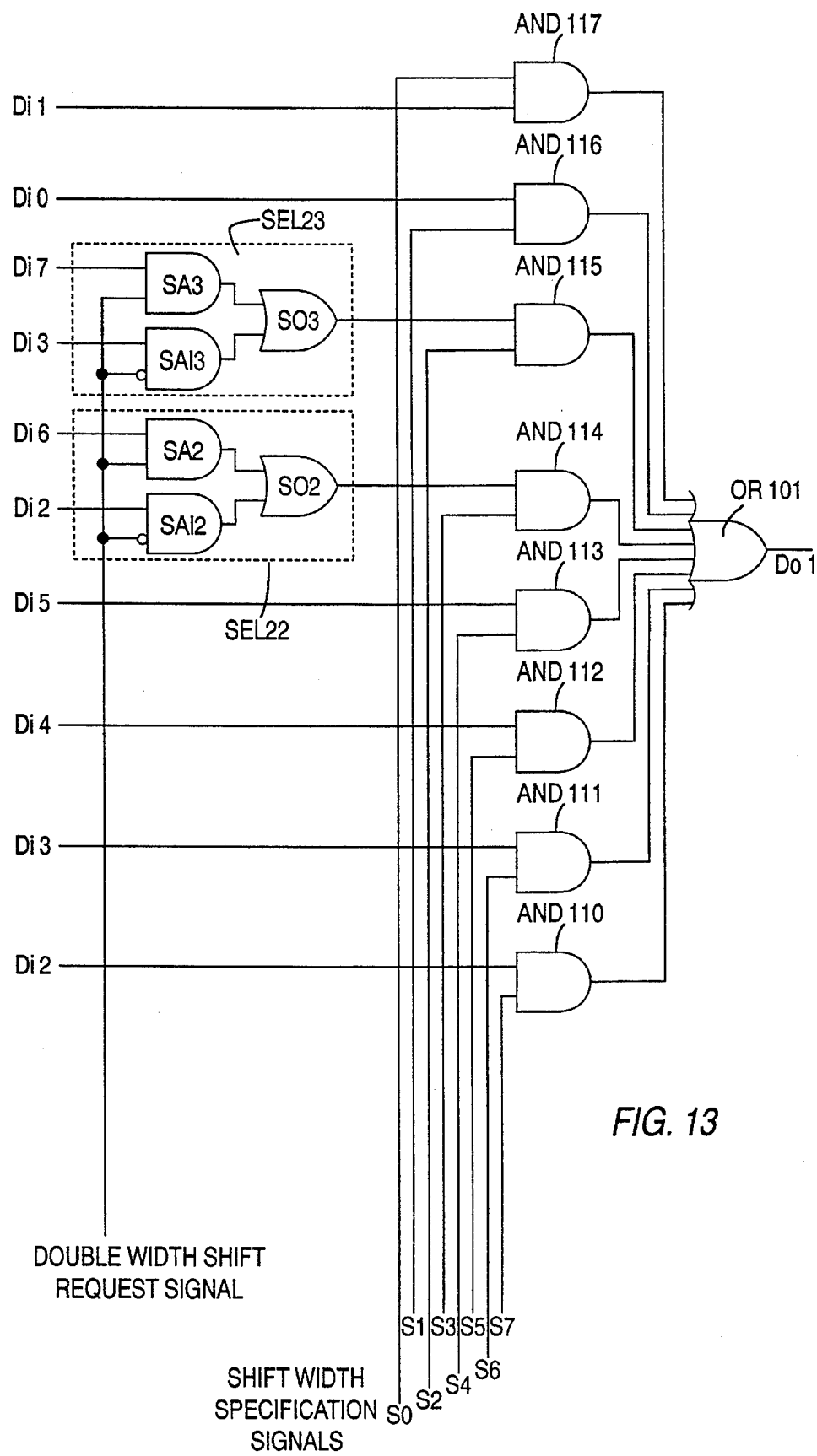
FIG. 13 is the seventh in the eight (8) part series of detailed circuit diagrams illustrating the fifth embodiment of this invention.

FIG. 13 is the seventh in the eight (8) part series of detailed circuit diagrams illustrating the fifth embodiment of this invention.

AND gates AND110, AND111, AND112, AND113, AND114, AND115, AND116 and AND117, respectively, receive at one of their input terminals shift width specification signals S7, S6, S5, S4, S3, S2, S1 and S0 and at the other one of their input terminals four (4) input data Di2, Di3, Di4 and Di5, two (2) outputs from selectors SEL22 and SEL23, and two (2) input data Di0 and Di1, and supply their conjunctive outputs to an OR gate OR101, which in turn emits a one (1) bit disjunctive output datum Do1.

Selector SEL22 comprises two (2) AND gates SA2 and SAI2, an OR gate SO2 and an inverter attached to an input terminal of AND gate SAI2. OR gate SO2 receives the conjunctive outputs from AND gates SA2 and SAI2 and supplies a disjunctive output to AND gate AND114 as an output from selector SEL22. AND gate SA2 receives an input datum Di6 at one of its input terminals and a double width shift request signal at the other one of its input terminals. AND gate SAI2 receives an input datum Di2 at one of its input terminals and the inverted double width shift request signal through the attached inverter at the other one of its input terminals.

Thus, when a request is made to shift data by the double shift width, selector SEL22 outputs input datum Di6 from OR gate SO2, because the double width shift request signal at a high level allows AND gate SA2 to open, while the inverted double width shift request signal at a low level disallows AND gate SAI2 to open.

Also, when a request is not made to shift data by the double shift width, the selector SEL22 outputs input datum Di3 from OR gate SO2, because the double width shift request signal at a low level disallows AND gate SA2 to open, while the inverted double width shift request signal at a high level allows AND gate SAI2 to open.

Selector SEL23 comprises two (2) AND gates SA3 and SAI3, an OR gate SO3 and an inverter attached to an input terminal of AND gate SAI3. OR gate SO3 receives the conjunctive outputs from AND gates SA3 and SAI3 and supplies a disjunctive output to AND gate AND115 as an output from selector SEL23. AND gate SA3 receives an input datum Di7 at one of its input terminals and a double width shift request signal at the other one of its input terminals. AND gate SAI3 receives an input datum Di3 at one of its input terminals and the inverted double width shift request signal through the attached inverter at the other one of its input terminals.

Thus, when a request is made to shift data by the double shift width, selector SEL23 outputs input datum Di7 from OR gate SO3, because the double width shift request signal at a high level allows AND gate SA3 to open, while the inverted double width shift request signal at a low level disallows AND gate SAI3 to open.

Also, when a request is not made to shift data by the double shift width, the selector SEL23 outputs input datum Di3 from OR gate SO3, because the double width shift request signal at a low level disallows AND gate SA3 to open, while the inverted double width shift request signal at a high level allows AND gate SAI3 to open.

Only one (1) of the shift width specification signals S7, S6, S5, S4, S3, S2, S1 and S0 is at a high level. Therefore, only the corresponding one (1) of the AND gates AND110, AND111, AND112, AND113, AND114, AND115, AND116 and AND117, thereby will allow only the corresponding one (1) of the input data Di2, Di3, Di4, Di5, Di6 or Di2, Di7 or Di3, Di0 and Di1 to pass through to OR gate OR101. Since only one (1) of the AND gates AND110, AND111, AND112, AND113, AND114, AND115, AND116 and AND117 is open, while all the others are shut, OR gate OR101 allows the corresponding one (1) of the input data Di2, Di3, Di4, Di5, Di6 or Di2, Di7 or Di3, Di0 and Di1 to be emitted as the output datum Do1 as the seventh most significant bit.

That is, when the shift width specification signal S3 specifies the shift width of three (3) bits, the output datum Do1 is different if the input data are shifted by the double shift width than if they are shifted by the single shift width. Thus, selector SEL22 selects either input datum Di6 or input datum Di2 according to the double width shift request signal.

Similarly, when the shift width specification signal S2 specifies the shift width of two (2) bits, the output datum Do1 is different if the input data are shifted by the double shift width than if they are shifted by the single shift width. Thus, selector SEL23 selects either input datum Di7 or input datum Di3 according to the double width shift request signal.

Figure 14:
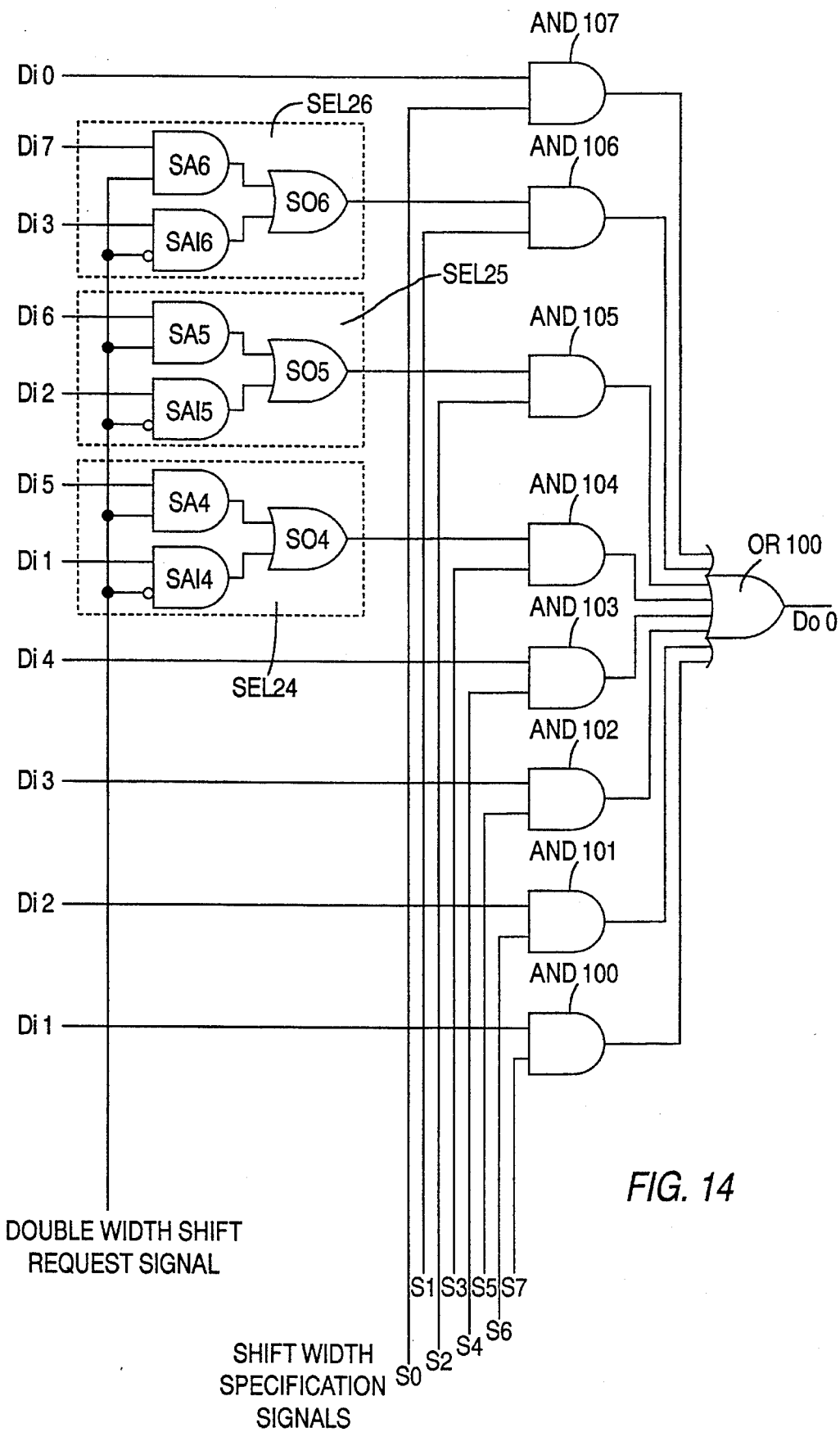
FIG. 14 is the eighth in the eight (8) part series of detailed circuit diagrams illustrating the fifth embodiment of this invention.

FIG. 14 is the eighth in the eight (8) part series of detailed circuit diagrams illustrating the fifth embodiment of this invention.

AND gates AND100, AND101, AND102, AND103, AND104, AND105, AND106 and AND107, respectively, receive at one of their input terminals shift width specification signals S7, S6, S5, S4, S3, S2, S1 and S0 and at the other one of their input terminals four (4) input data Di1, Di2, Di3 and Di4, three (3) outputs from selectors SEL24, SEL25 and SEL26, and one (1) input datum Di0, and supply their conjunctive outputs to an OR gate OR100, which in turn emits a one (1) bit disjunctive output datum Do0.

Selector SEL24 comprises two (2) AND gates SA4 and SAI4, an OR gate SO4 and an inverter attached to an input terminal of AND gate SAI4. OR gate SO4 receives the conjunctive outputs from AND gates SA4 and SAI4 and supplies a disjunctive output to AND gate AND104 as an output from selector SEL24. AND gate SA4 receives an input datum Di5 at one of its input terminals and a double width shift request signal at the other one of its input terminals. AND gate SAI4 receives an input datum Di1 at one of its input terminals and the inverted double width shift request signal through the attached inverter at the other one of its input terminals.

Thus, when a request is made to shift data by the double shift width, selector SEL24 outputs input datum Di5 from OR gate SO4, because the double width shift request signal at a high level allows AND gate SA4 to open, while the inverted double width shift request signal at a low level disallows AND gate SAI4 to open.

Also, when a request is not made to shift data by the double shift width, the selector SEL24 outputs input datum Di1 from OR gate SO4, because the double width shift request signal at a low level disallows AND gate SA4 to open, while the inverted double width shift request signal at a high level allows AND gate SAI4 to open.

Selector SEL25 comprises two (2) AND gates SA5 and SAI5, an OR gate SO5 and an inverter attached to an input terminal of AND gate SAI5. OR gate SO5 receives the conjunctive outputs from AND gates SA5 and SAI5 and supplies a disjunctive output to AND gate AND104 as an output from selector SEL25. AND gate SA5 receives an input datum Di6 at one of its input terminals and a double width shift request signal at the other one of its input terminals. AND gate SAI5 receives an input datum Di2 at one of its input terminals and the inverted double width shift request signal through the attached inverter at the other one of its input terminals.

Thus, when a request is made to shift data by the double shift width, selector SEL25 outputs input datum Di6 from OR gate SO5, because the double width shift request signal at a high level allows AND gate SA5 to open, while the inverted double width shift request signal at a low level disallows AND gate SAI5 to open.

Also, when a request is not made to shift data by the double shift width, the selector SEL25 outputs input datum Di2 from OR gate SO5, because the double width shift request signal at a low level disallows AND gate SA5 to open, while the inverted double width shift request signal at a high level allows AND gate SAI5 to open.

Selector SEL26 comprises two (2) AND gates SA6 and SAI6, an OR gate SO6 and an inverter attached to an input terminal of AND gate SAI6. OR gate SO6 receives the conjunctive outputs from AND gates SA6 and SAI6 and supplies a disjunctive output to AND gate AND106 as an output from selector SEL26. AND gate SA6 receives an input datum Di7 at one of its input terminals and a double width shift request signal at the other one of its input terminals. AND gate SAI6 receives an input datum Di3 at one of its input terminals and the inverted double width shift request signal through the attached inverter at the other one of its input terminals.

Thus, when a request is made to shift data by the double shift width, selector SEL26 outputs input datum Di7 from OR gate SO6, because the double width shift request signal at a high level allows AND gate SA6 to open, while the inverted double width shift request signal at a low level disallows AND gate SAI6 to open.

Also, when a request is not made to shift data by the double shift width, the selector SEL26 outputs input datum Di3 from OR gate SO6, because the double width shift request signal at a low level disallows AND gate SA6 to open, while the inverted double width shift request signal at a high level allows AND gate SAI6 to open.

Only one (1) of the shift width specification signals S7, S6, S5, S4, S3, S2, S1 and SO is at a high level. Therefore, only the corresponding one (1) of the AND gates AND100, AND101, AND102, AND103, AND104, AND105, AND106 and AND107, thereby will allow only the corresponding one (1) of the input data Di1, Di2, Di3, Di4, Di5 or Di1, Di6 or Di2, Di7 or Di3, and Di0 to pass through to OR gate OR100. Since only one (1) of the AND gates AND100, AND101, AND102, AND103, AND104, AND105, AND106 and AND107 is open, while all the others are shut, OR gate OR100 allows the corresponding one (1) of the input data Di1, Di2, Di3, Di4, Di5 or Di1, Di6 or Di2, Di7 or Di3, and Di0 to be emitted as the output datum Do0 as the eighth most significant bit.

That is, when the shift width specification signal S3 specifies the shift width of three (3) bits, the output datum Do0 is different if the input data are shifted by the double shift width if they are shifted than by the single shift width. Thus, selector SEL24 selects either input datum Di5 or input datum Di1 according to the double width shift request signal.

Similarly, when the shift width specification signal S2 specifies the shift width of two (2) bits, the output datum Do0 is different if the input data are shifted by the double shift width than if they are shifted by the single shift width. Thus, selector SEL25 selects either input datum Di6 or input datum Di2 according to the double width shift request signal.

Similarly, when the shift width specification signal S1 specifies the shift width of one (1) bit, the output datum Do0 is different if the input data are shifted by the double shift width than if they are shifted by the single shift width. Thus, selector SEL26 selects either input datum Di7 or input datum Di3 according to the double width shift request signal.

The above explanations for the operations of the fifth embodiment of this invention, shown in FIGS. 7 through 14 are summarized as follows:

Output data Do3, Do2, Do1 and Do0, shown respectively in FIGS. 11, 12, 13 and 14, operate as outputs of shifting input data both by the single shift width and by the double shift width. Hence, a barrel shifter pursuant to the fifth embodiment of this invention must selectively output only the input data Di0, Di1, Di2 and Di3, such that a four (4) bit input is shifted by the single shift width. Thus, the selectors SEL21 through SEL26 are provided for selecting the four (4) least significant bits.

FIG. 15 illustrates output data obtained by shifting exemplary input data by a double shift width pursuant to the fifth embodiment of this invention.

When a barrel shifter having such circuits as those illustrated in FIGS. 7 through 14 rotate-shifts input data Di7, Di6, Di5, Di4, Di3, Di2, Di1 and Di0 by two (2) bits to the left in a double width shift, output data Di5, Di4, Di3, Di2, Di1, Di0, Di7 and Di6 are stored as an eight (8) bit output, comprising Do7, Do6, Do5, Do4, Do3, Do2, Do1 and Do0.

FIG. 16 illustrates output data obtained by shifting exemplary input data by a single shift width pursuant to the fifth embodiment of this invention.

When a barrel shifter having such circuits as those illustrated in FIGS. 7 through 14 rotate-shifts input data Di7, Di6, Di5, Di4, Di3, Di2, Di1 and Di0 by two (2) bits to the left in a single width shift, output data Di5, Di4, Di3, Di2, Di1, Di0, Di3 and Di2 are stored as an eight (8) bit output, comprising Do7, Do6, Do5, Do4, Do3, Do2, Do1 and Do0. At this time, output data Do7, Do6, Do5 and Do4 in the four (4) most significant bits are not meaningful, and only output data Do3, Do2, Do1 and Do0 in the four (4) least significant bits are meaningful.

Although the fifth embodiment of this invention shown in FIGS. 7 through 16 configures only the four (4) least significant bits to be used as meaningful output data, an embodiment of this invention is by no means restricted to this arrangement. Instead, it is also possible to use the four (4) most significant bits, as meaningful output data of a barrel shifter.

The configurations of a sixth embodiment shown in FIGS. 17 through 21 are for outputting the four (4) most significant bits of data, which are the same as the four (4) least significant bits of data, when input data are shifted by the single width.

The sixth embodiment shown in FIGS. 17 through 21 assumes that one (1) word comprises four (4) bits.

Because the circuits relating to the four (4) least significant bits are configured similarly to those for the same shown in FIGS. 11 through 14 in the description of the fifth embodiment, FIGS. 17 through 20 only show the circuit configurations relating to the four (4) most significant bits.

FIGS. 17 through 20 correspond to FIGS. 7 through 10, and the same parts have the same numbers. In FIGS. 17 through 20, a selector is provided for each AND gate receiving any of shift width specification signals S0, S1, S2 and S3 at one input terminal and any of input data Di7, Di6, Di5 and Di4 at the other input terminal. Such a selector is provided at the other input terminal for enabling selections to be made between input data Di7 and Di3, between input data Di6 and Di2, between input data Di5 and Di1, or between input data Di4 and Di0.

Because each of selectors SEL31 through SEL40 shown in FIGS. 17 through 20 has essentially the same configuration as that of any one of the selectors SEL21 through SEL26 shown in FIGS. 12, 13 and 14, their operations are not explained again.

Accordingly, the configurations shown in FIGS. 17 through 20 are described below only by highlighting the differences from those shown in FIGS. 7 through 10.

Figure 17:
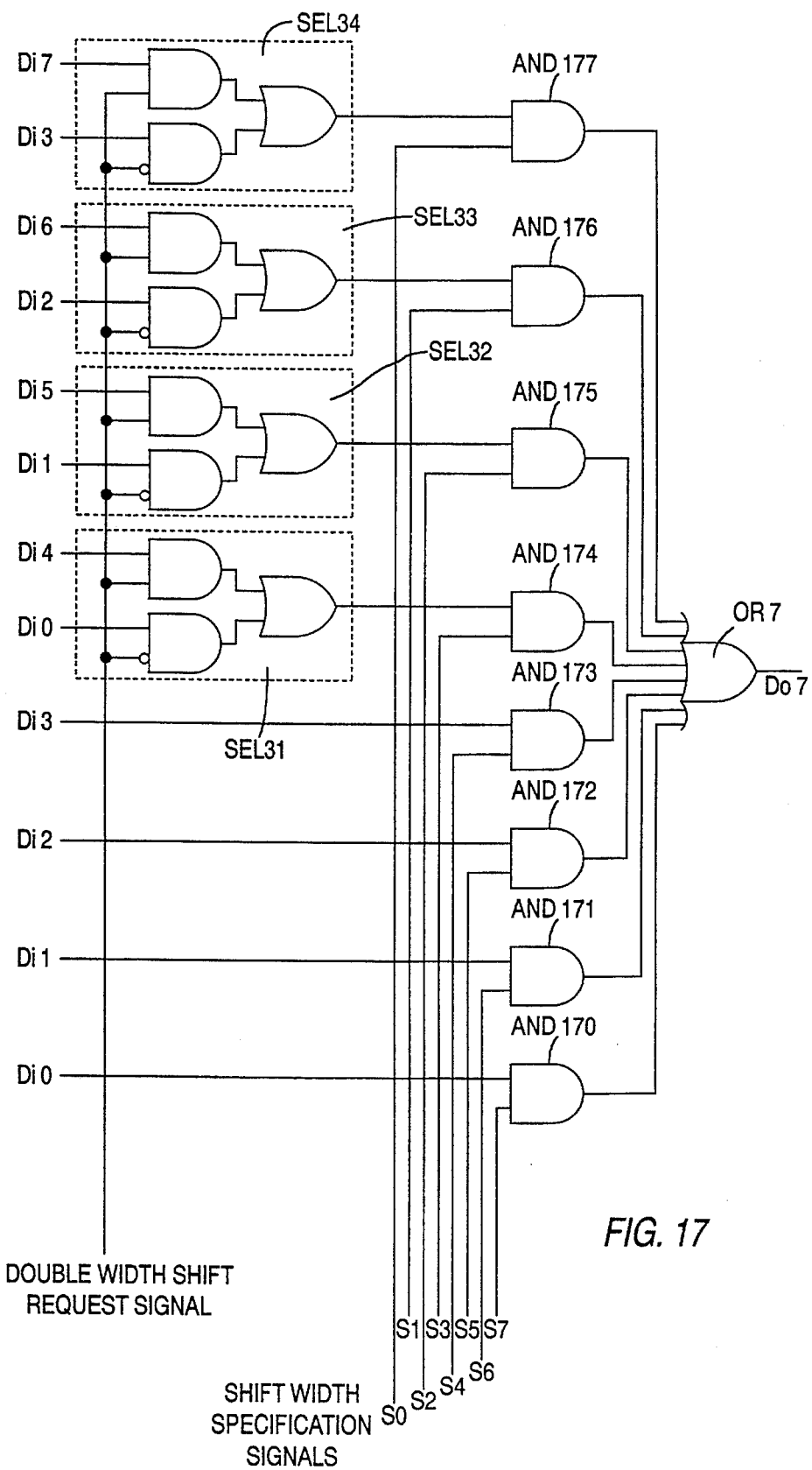
FIG. 17 is the first in a four (4) part series of detailed circuit diagrams illustrating a sixth embodiment of this invention.

FIG. 17 is the first in the four (4) part series of detailed circuit diagrams illustrating a sixth embodiment of this invention.

The configuration of the sixth embodiment shown in FIG. 17 corresponds to that of the fifth embodiment shown in FIG. 7, with four (4) selectors SEL31, SEL32, SEL33 and SEL34 newly added. Parts shown in FIG. 17 which are the same as those shown in FIG. 7 have the same numbers.

AND gates AND174, AND175, AND176 and AND177, respectively, receive at one of their input terminals outputs from the selectors SEL31, SEL32, SEL33 and SEL34 and at the other one of their input terminals shift width specification signals S3, S2, S1 and S0, thus selectively receiving either input data Di4, Di5, Di6 and Di7 or input data Di0, Di1, Di2 and Di3.

Figure 18:
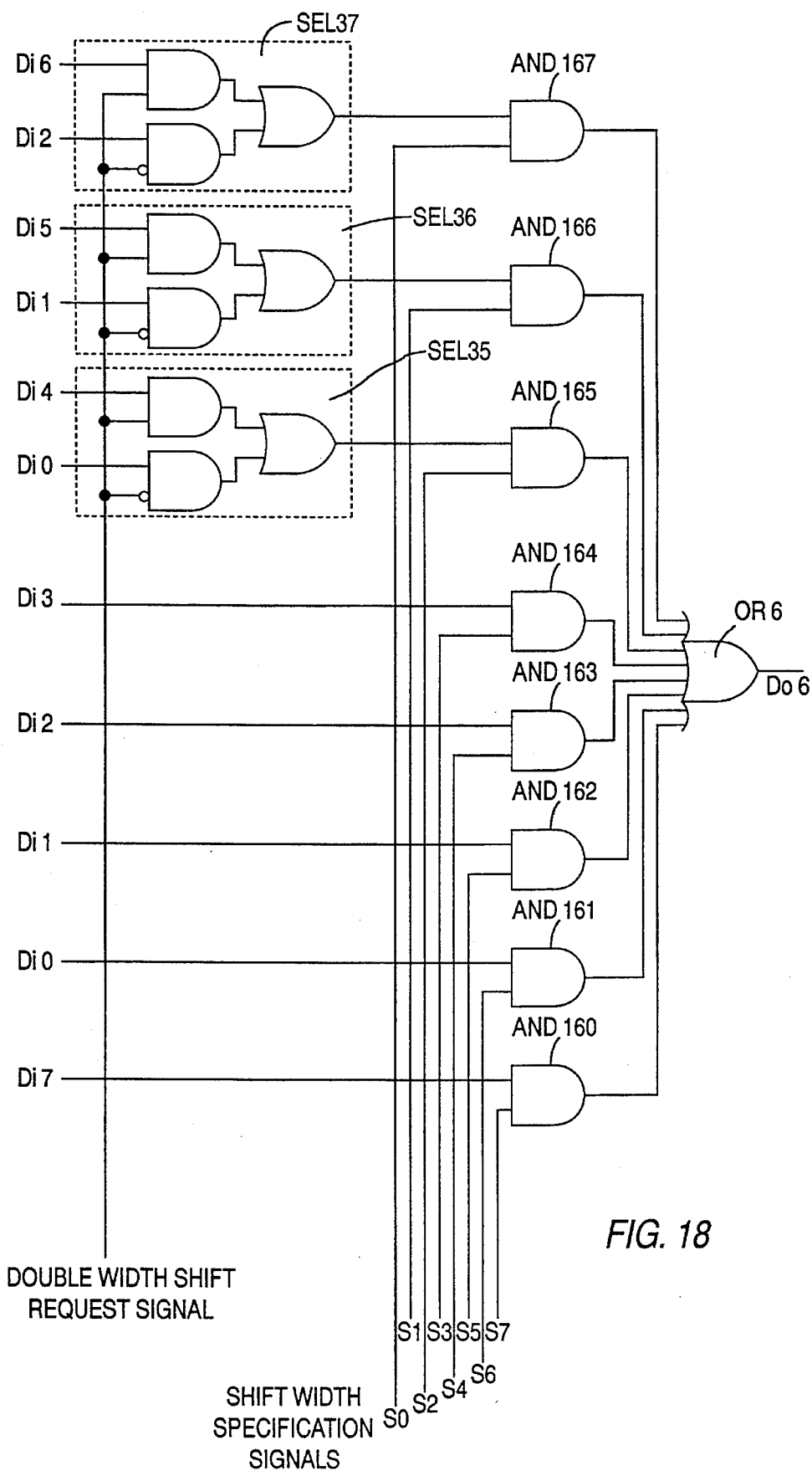
FIG. 18 is the second in the four (4) part series of detailed circuit diagrams illustrating the sixth embodiment of this invention.

FIG. 18 is the second in the four (4) part series of detailed circuit diagrams illustrating the sixth embodiment of this invention.

The configuration of the sixth embodiment shown in FIG. 18 corresponds to that of the fifth embodiment shown in FIG. 8, with three (3) selectors SEL35, SEL36 and SEL37 newly added. Parts shown in FIG. 18 which are the same as those in FIG. 8 have the same numbers.

AND gates AND165, AND166 and AND167, respectively, receive at one of their input terminals outputs from the selectors SEL35, SEL36 and SEL37 and at the other one of their input terminals shift width specification signals S2, S1 and S0, thus selectively receiving either input data Di4, Di5 and Di6 or input data Di0, Di1 and Di2.

Figure 19:
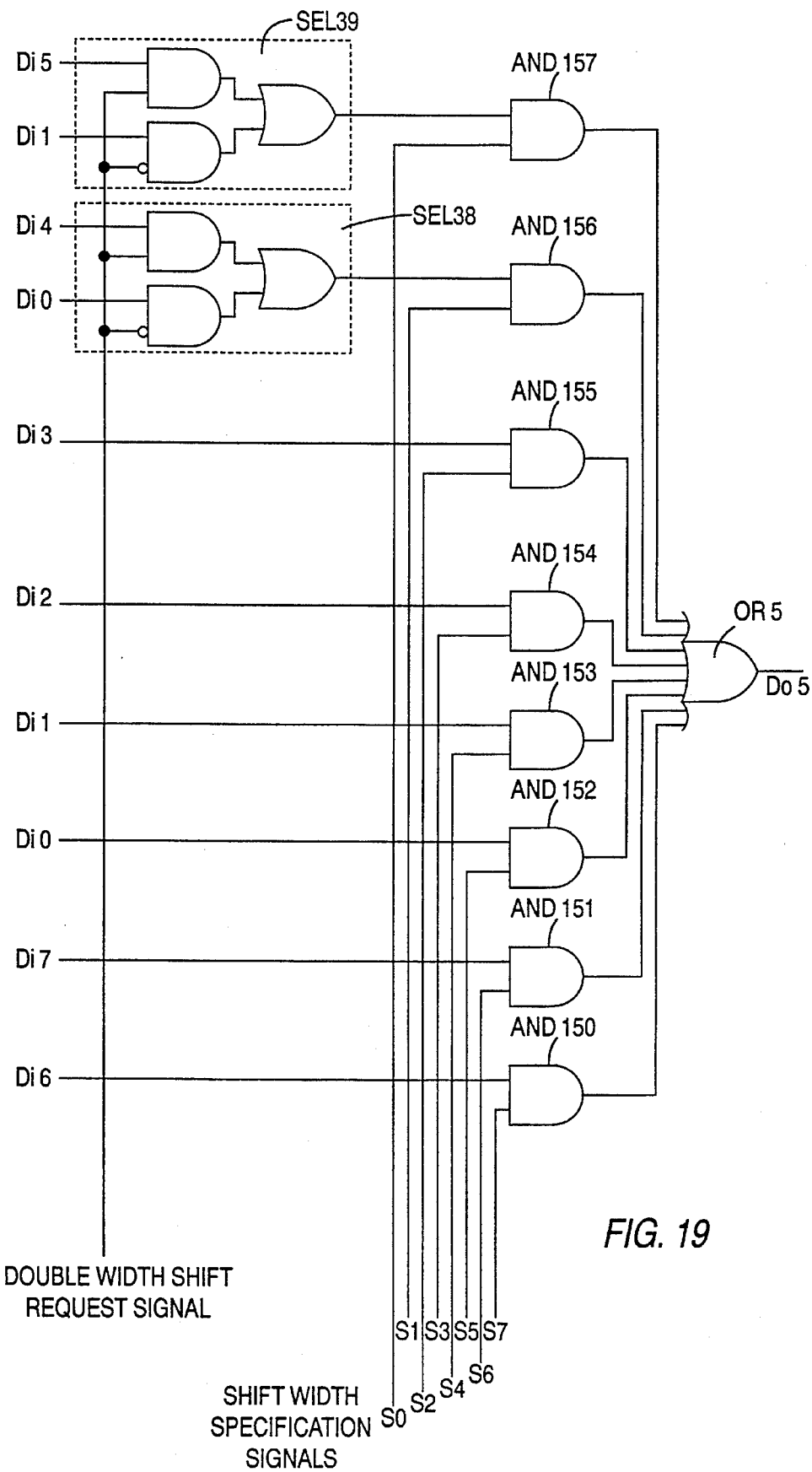
FIG. 19 is the third in the four (4) part series of detailed circuit diagrams illustrating the sixth embodiment of this invention.

FIG. 19 is the third in the four (4) part series of detailed circuit diagrams illustrating the sixth embodiment of this invention.

The configuration of the sixth embodiment shown in FIG. 19 corresponds to that of the fifth embodiment shown in FIG. 9, with two (2) selectors SEL38 and SEL39 newly added. Parts shown in FIG. 19 which are the same as those shown in FIG. 9 have the same numbers.

AND gates AND156 and AND157, respectively, receive at one of their input terminals outputs from the selectors SEL38 and SEL39 and at the other one of their input terminals shift width specification signals S1 and S0, thus selectively receiving either input data Di4 and Di5 or input data Di0 and Di1.

Figure 20:
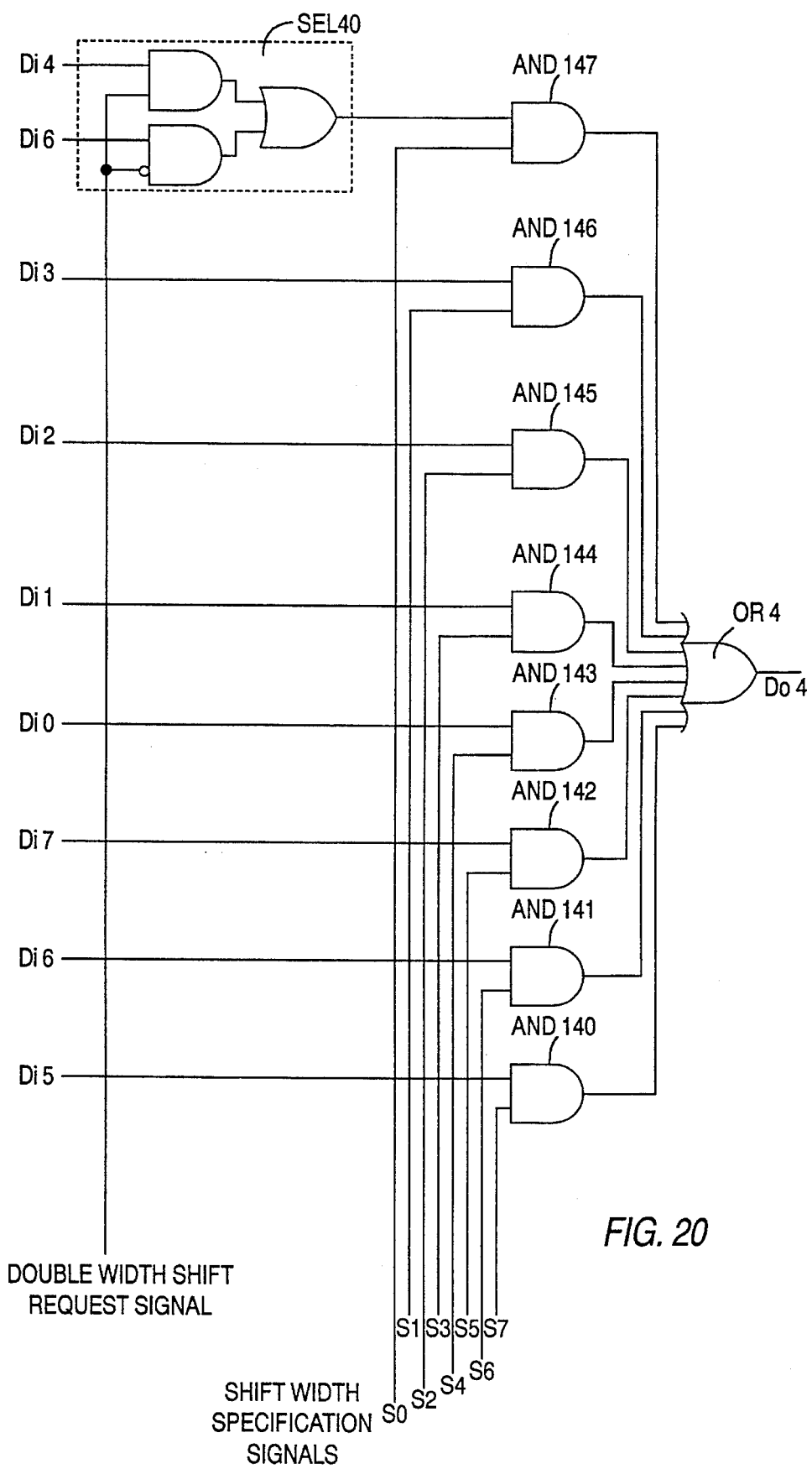
FIG. 20 is the fourth in the four (4) part series of detailed circuit diagrams illustrating the sixth embodiment of this invention.

FIG. 20 is the fourth in the four (4) part series of detailed circuit diagrams illustrating the sixth embodiment of this invention.

The configuration of the sixth embodiment shown in FIG. 20 corresponds to that of the fifth embodiment shown in FIG. 10, with one (1) selector SEL40 newly added. Parts shown in FIG. 20 which are the same as those in FIG. 10 have the same numbers.

AND gate AND147 receives at one of its input terminals an output from the selector SEL40 and at the other one of its input terminals a shift width specification signal S0, thus selectively receiving either an input datum Di4 or an input datum Di0.

FIG. 21 illustrates output data obtained by shifting exemplary input data by a single shift width pursuant to the sixth embodiment of this invention.

More specifically, it shows an example of shifting input data by two (2) bits to the left to produce output data whose (4) most significant bits are the same as its four (4) least significant bits.

Figure 22:
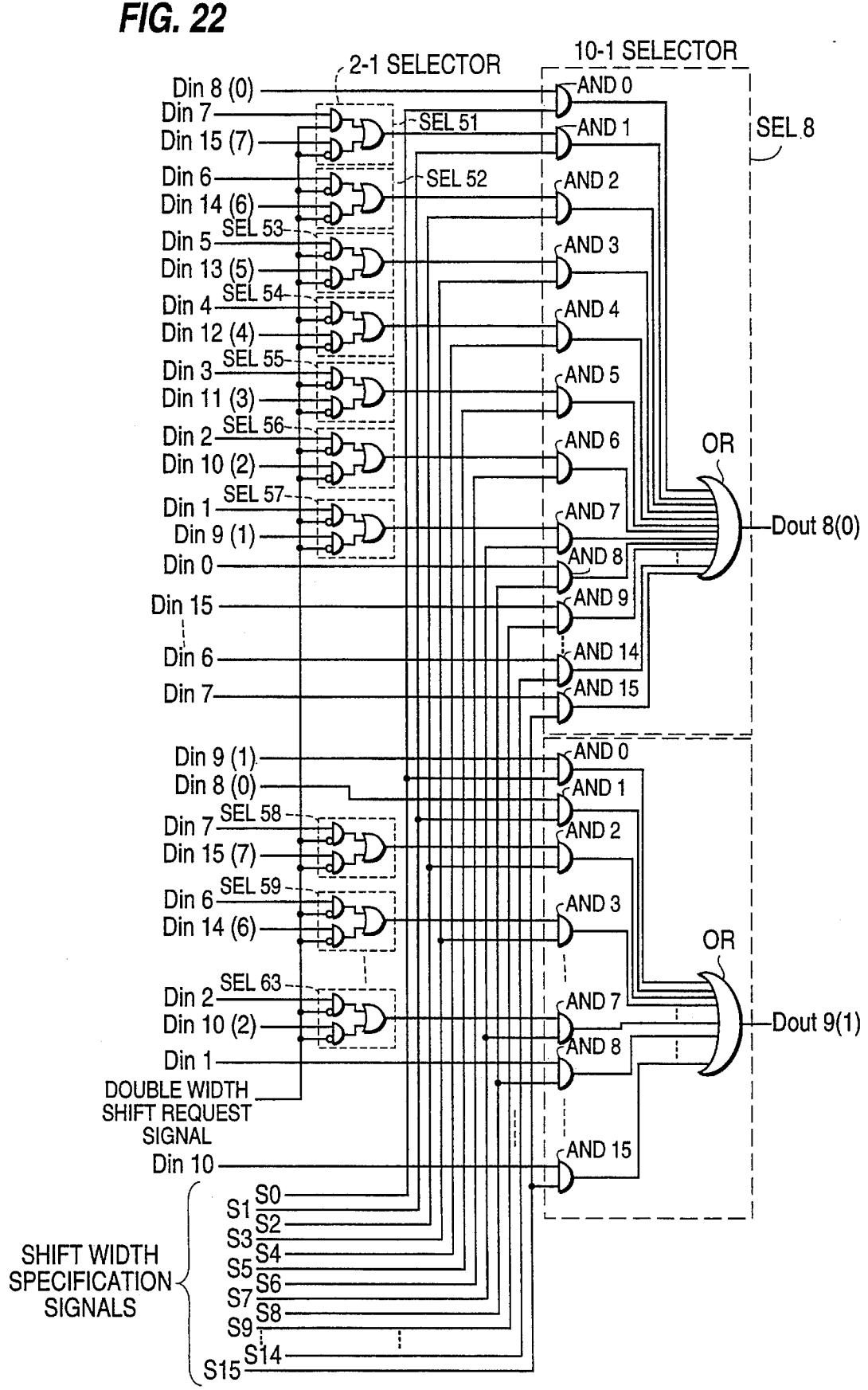
FIG. 22 is the first in a two (2) part series of detailed circuit diagrams illustrating a seventh embodiment of this invention.

FIG. 22 is the first in a two (2) part series of detailed circuit diagrams illustrating a seventh embodiment of this invention.

Figure 23:
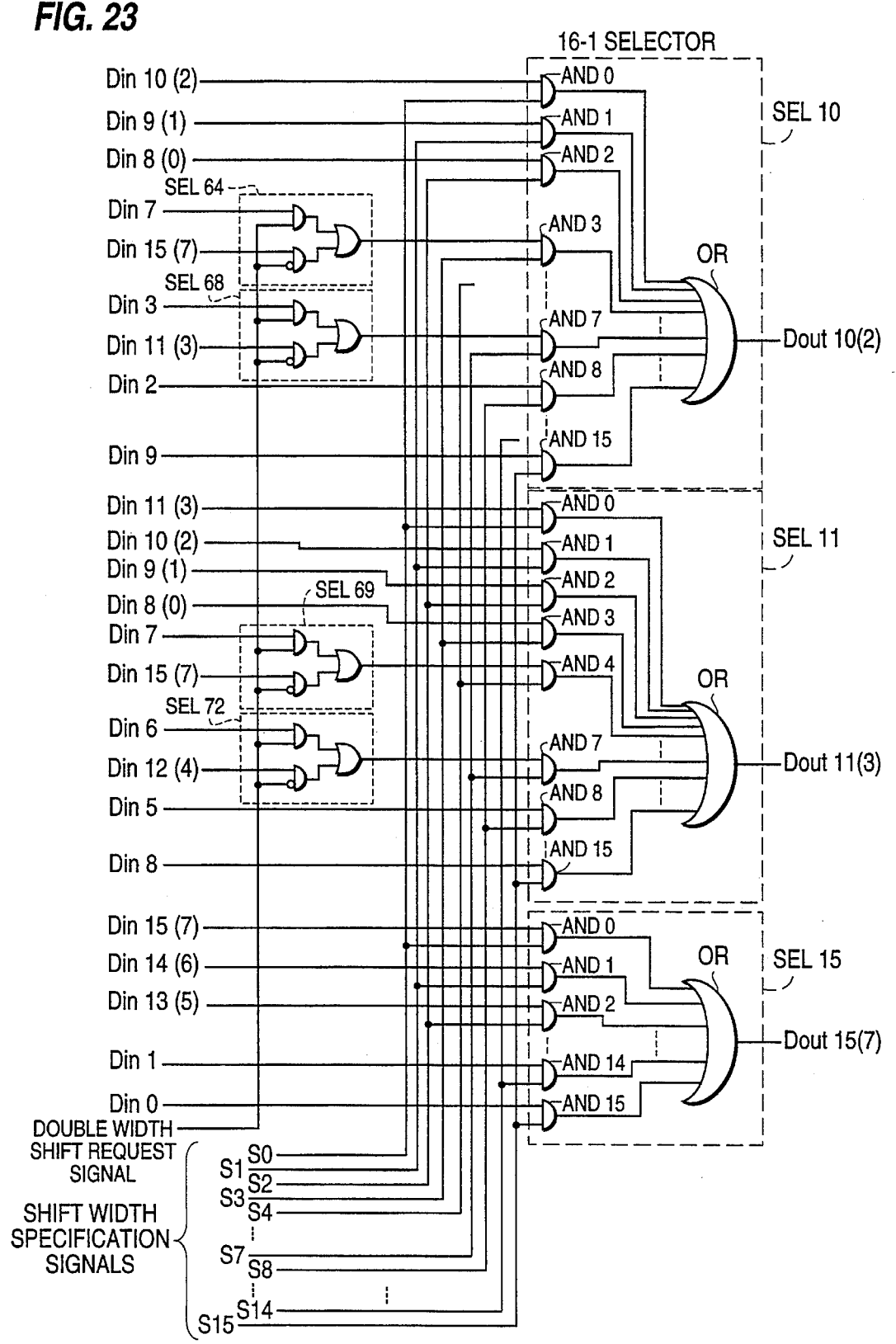
FIG. 23 is the second in the two (2) part series of detailed circuit diagrams illustrating the seventh embodiment of this invention.

FIG. 23 is the second in the two (2) part series of detailed circuit diagrams illustrating the seventh embodiment of this invention.

The seventh embodiment shown in FIGS. 22 and 23 assumes that one (1) word comprises eight (8) bits.

Although the fifth and sixth embodiments of this invention assume the double shift width being eight (8) bits, (i.e., one (1) word comprising four (4) bits), the number of bits in a word does not have to be limited to this number. The seventh embodiment of this invention assumes the double shift width being sixteen (16) bits, (i.e., one (1) word comprising eight (8) bits).

As with the configuration shown in FIG. 3, a barrel shifter for shifting input data by the double shift width comprises the sixteen (16) 16/1 selectors SEL0 through SEL15 (each receiving sixteen (16) inputs and emitting one (1) output) provided in bit units.

Accordingly, the configurations shown in FIGS. 22 and 23 are described below only by highlighting the differences from that shown in FIG. 3. Parts shown in FIGS. 22 and 23 which are the same as those shown in FIG. 3 have the same numbers.

The barrel shifter further comprises an additional twenty-eight (28) selectors SEL51 through SEL78 in correspondence with the eight (8) most significant bits, for selecting the eight (8) least significant bits when input data are shifted by the single shift width. This allows input data to be shifted both by the double shift width and the single shift width.

Output data Dout8 through Dout15 are the same as output data Dout0 through Dout7 when input data are shifted by the single width.

Therefore, a selector is provided for each AND gate receiving any of shift width specification signals S1, S2, S3, S4, S5, S6 and S7 at one input terminal and any of input data Din15, Din14, Din13, Din12, Din11, Din10 and Din9 at the other input terminal. Such a selector is provided at the other input terminal for enabling selections to be made between input data Din15 and Din7; between input data Din14 and Din6; between input data Din13 and Din5; between input data Din12 and Din4; between input data Din11 and Din3; between input data Din10 and Din2; or between input data Din9 and Din1.

AND gates AND1, AND2, AND3, AND4, AND5, AND6 and AND7 of selector SEL8, respectively, receive at one of their input terminals outputs from seven (7) selectors SEL51, SEL52, SEL53, SEL54, SEL55, SEL56 and SEL57 and at the other one of their input terminals shift width specification signals S1, S2, S3, S4, S5, S6 and S7. Thus, the AND gates selectively receive either input data Din15, Din14, Din13, Din12, Din11, Din10 and Din9 or input data Din7, Din6, Din5, Din4, Din3, Din2 and Din1.

AND gates AND2, AND3, AND4, AND5, AND6 and AND7 of selector SEL9, respectively, receive at one of their input terminals outputs from six (6) selectors SEL58, SEL59, SEL60, SEL61, SEL62 and SEL63 and at the other one of their input terminals shift width specification signals S2, S3, S4, S5, S6 and S7. Thus, the AND gates selectively receive either input data Din15, Din14, Din13, Din12, Din11 and Din10 or input data Din7, Din6, Din5, Din4, Din3 and Din2.

AND gates AND3, AND4, AND5, AND6 and AND7 of selector SEL10, respectively, receive at one of their input terminals outputs from five (5) selectors SEL64, SEL65, SEL66, SEL67 and SEL68 and at the other one of their input terminals shift width specification signals S3, S4, S5, S6 and S7, thus selectively receiving either input data Din15, Din14, Din13, Din12 and Din11 or input data Din7, Din6, Din5, Din4 and Din3.

AND gates AND4, AND5, AND6 and AND7 of selector SEL11, respectively, receive at one of their input terminals outputs from four (4) selectors SEL69, SEL70, SEL71 and SEL72 and at the other one of their input terminals shift width specification signals S4, S5, S6 and S7. Thus, the AND gates selectively receive either input data Din15, Din14, Din13 and Din12 or input data Din7, Din6, Din5 and Din4.

AND gates AND5, AND6 and AND7 of selector SEL12, respectively, receive at one of their input terminals outputs from three (3) selectors SEL73, SEL74 and SEL75 and at the other one of their input terminals shift width specification signals S5, S6 and S7. Thus, the AND gates selectively receive either input data Din15, Din14 and Din13, or input data Din7, Din6 and Din5.

AND gates AND6 and AND7 of selector SEL13, respectively, receive at one of their input terminals outputs from two (2) selectors SEL76 and SEL77 and at the other one of their input terminals shift width specification signals S6 and S7. Thus, the AND gates selectively receive either input data Din15 and Din14 or input data Din7 and Din6.

Finally, AND gate AND7 of selector SEL14 receives at one of its input terminals output from one (1) selector SEL78 and at the other one of their input terminals shift width specification signal S7. Thereby, selectively receiving either input datum Din15 or input datum Din7.

Therefore, a total of twenty-eight (28) selectors SEL51 through SEL78 need to be provided additionally.

Because each of selectors SEL51 through SEL78 shown in FIGS. 22 and 23 has essentially the same configuration as that of any one of the selectors SEL21 through SEL26 shown in FIGS. 12, 13 and 14, as well as selectors SEL31 through SEL40 shown in FIGS. 17 through 20, their operations are not explained again.

Figure 24:
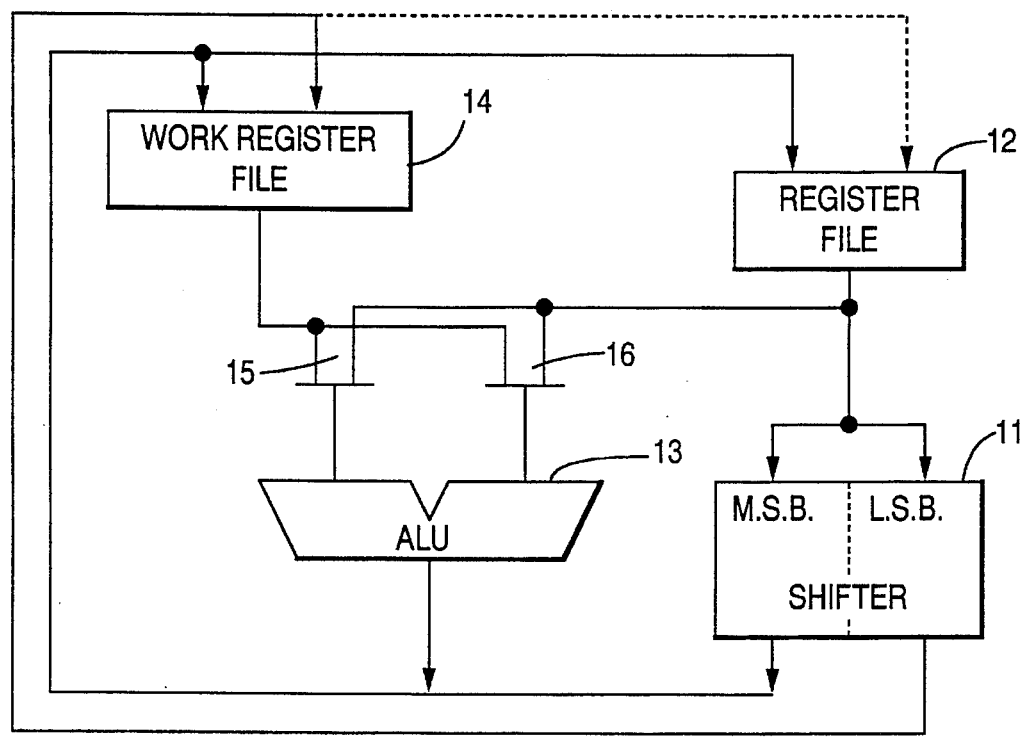
FIG. 24 is a block diagram of an eighth embodiment of this invention.

FIG. 24 is a block diagram of an eighth embodiment of this invention.

The eighth embodiment shown in FIG. 24 corresponds to the first embodiment shown in FIG. 2, with a work register 14 and selectors 15 and 16 further added. Parts shown in FIG. 24 which are the same as those shown in FIG. 2 have the same numbers and their re-explanations are omitted.

The eighth embodiment shown in FIGS. 24, 25, 28 and 29 assumes that one (1) word comprises sixteen (16) bits.

The ALU 13 receives outputs from a register file 12 and a work register file 14 through the selectors 15 and 16. A controller (not shown) has the selectors 15 and 16 select an output from the work register file 14 or an output from the register file 12 and supply it to the ALU 13. This makes it possible to freely select a register as a destination register.

Also, the shifter 11 receives the contents of the two (2) registers selected in the register file 12 and shifts them.

When eight (8) bit data of the double shift width are processed for operations in a byte unit, this configuration allows, in a single instruction, the work register 14 to temporarily store an output from the shifter 11 and the destination register in the register file 12 to store the result of a target operation performed thereafter.

Figure 25:
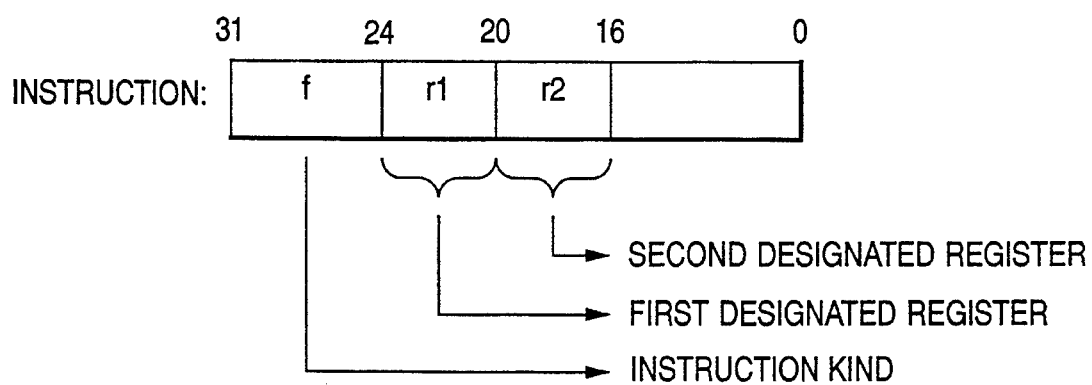
FIG. 25 shows the structure of an instruction.

FIG. 25 shows the structure of an instruction.

The eight (8) most significant bits, "f", specify the kind of instruction, e.g., a shift and a shift width; the next four (4) most significant bits, "r1", specify a first register; and the next four (4) most significant bits, "r2", specify a second register, which are used for shifting data. These specifications enable a single instruction to execute operations for shifting input data by a double shift width or a single shift width.

Figure 26:
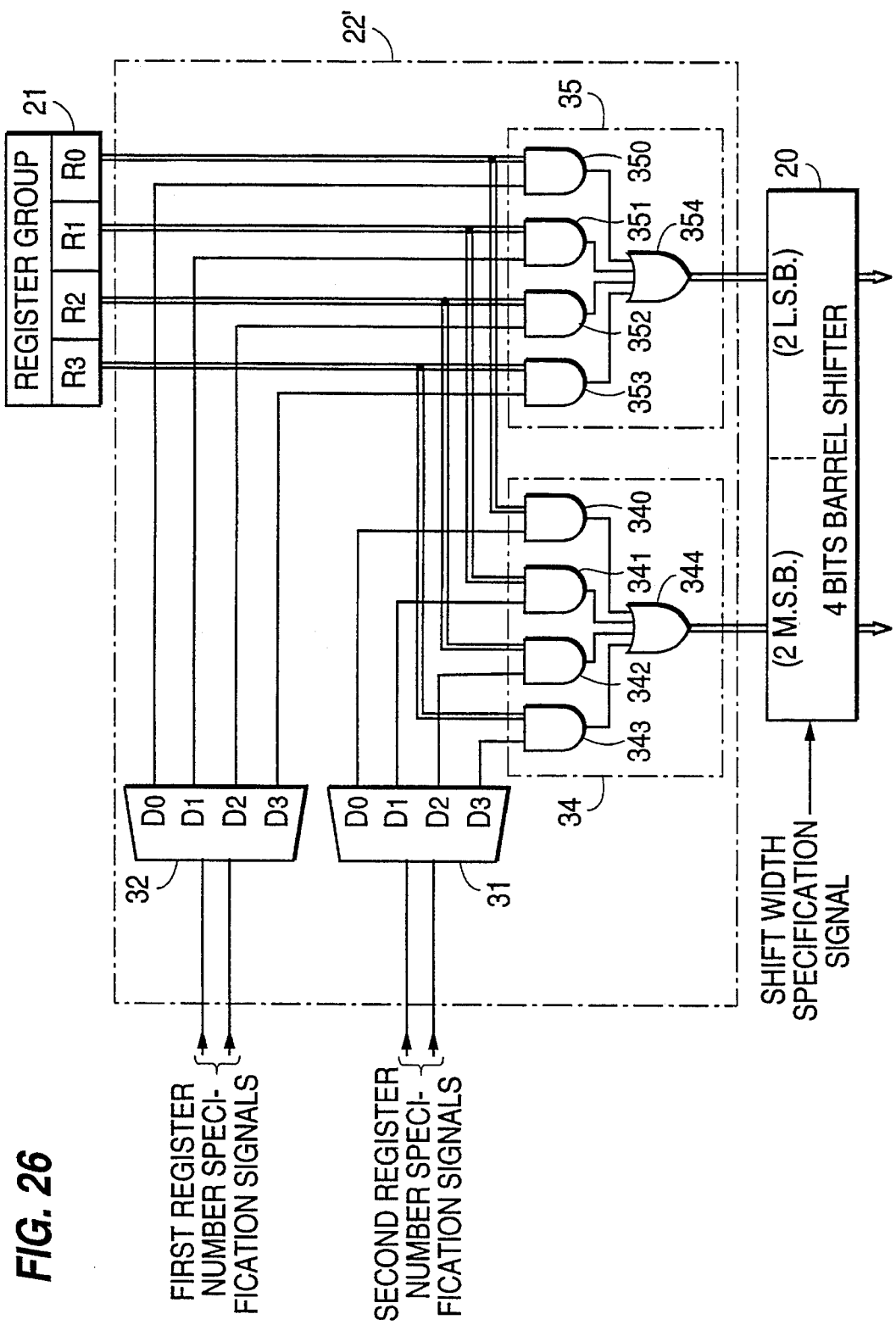
FIG. 26 is a block diagram of a ninth embodiment of this invention.

FIG. 26 is a block diagram of a ninth embodiment of this invention.

The ninth embodiment shown in FIGS. 26 and 27 assumes that one (1) word comprises two (2) bits.

The third embodiment shown in FIG. 5 assumes a designation of registers having even numbers and of collateral registers having the odd numbers equal to the even numbers incremented by one (1). However, an embodiment of this invention is by no means limited to such a form, but instead it can be arranged in such a way as to freely specify the registers.

Parts shown in FIG. 26 which are the same as those shown in FIG. 5 have the same numbers, and their re-explanations are omitted.

The differences between the configuration of the ninth embodiment shown in FIG. 26 and that of the third embodiment shown in FIG. 5 are as follows:

OR gate 33 is not included. The first decoder 31 and the second decoder 32 separately receive a first register number specification signal and a second register number specification signal for allowing registers to be freely designated.

For instance, four (4) bits "r1" and four (4) bits "r2" in an instruction having the structure shown in FIG. 25 enable register number specification signals inputted to the first decoder 31 and the second decoder 32 to be determined separately.

FIG. 27 is a block diagram of a register specifying circuit.

It is also possible to have a structure such that a single register specification designates two (2) registers.

When the second decoder 32 receives the register number specification signal "as is", the first decoder 31 receives it through an operator 18. The operator 18 also receives the double width shift request signal for changing the register number specification signal it outputs to the first decoder 31. The operator 18 comprises an adder, for example.

The operator 18 adds one (1) to the register number designated by the register number specification signal, such that the register having the succeeding register number is selected on receiving a double width shift request signal at a high level (e.g., of one (1)).

The operator 18 adds zero (0) to the register number designated by the register number specification signal, such that the same register (having the same register number) is selected on receiving a double width shift request signal at a low level (e.g., of zero (0)). This enables the most significant bits and the least significant bits to designate the same registers in shifting data by the single shift width. In this case, a designated register number can be any register number except the maximum register number.

Figure 28:
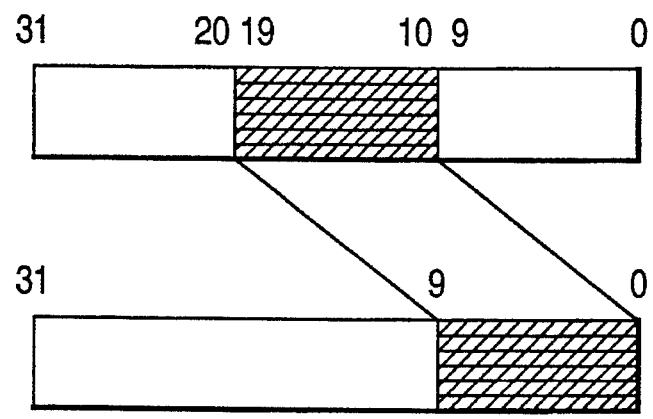
FIG. 28 illustrates an extraction of a plurality of variables defined in a single word.

FIG. 28 illustrates an extraction of a plurality of variables defined in a single word.

Figure 29:
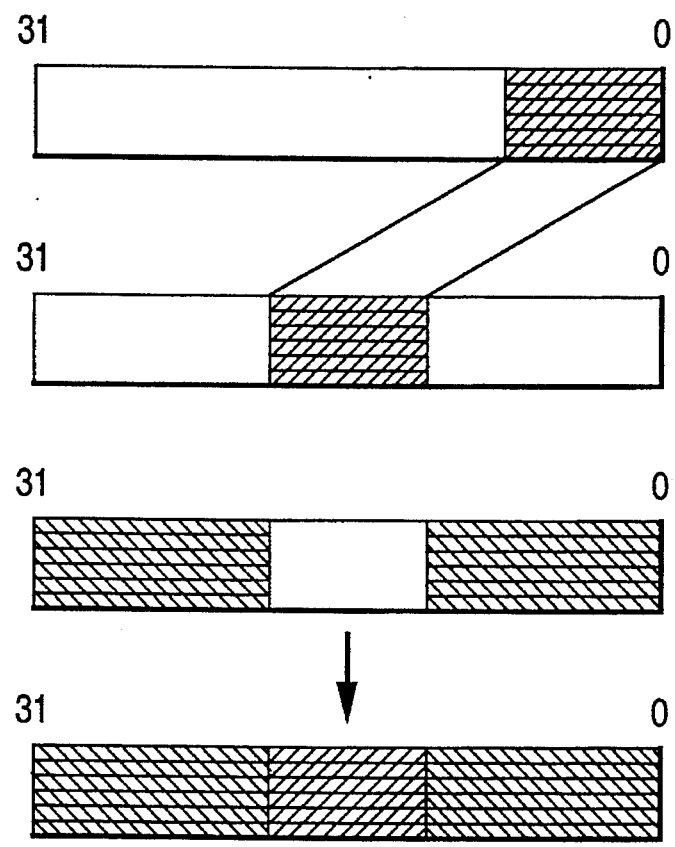
FIG. 29 illustrates a logical operation for a bit in a word.

FIG. 29 illustrates a logical operation for a bit in word.

The above embodiments of this invention enable a CPU whose word comprises sixteen (16) bits to shift data by thirty-two (32) bits.

Therefore, they enable a datum in any bit position within thirty-two (32) bits to be shifted to a target bit position as shown in FIG. 28.

Also, they enable a result obtained by an ordinary operation on variables to be shifted to a predetermined bit position and thence moved to a bit position in thirty-two (32) bit data.

Although the above descriptions of embodiments of this invention have explained examples of rotate-shifting data by the double/single shift widths of two (2)/four (4) bits (shown as the second, third, fourth and ninth embodiments in FIGS. 4, 5, 6, 27 and 28), four (4)/eight (8) bits (shown as the fifth and sixth embodiments in FIGS. 7 through 21), eight (8)/sixteen (16) bits (shown as the first and seventh embodiments in FIGS. 2, 3, 22 and 23), or sixteen (16)/thirty-two (32) bits (shown as the eighth embodiment in FIGS. 24, 25, 28 and 29), it goes without saying that application of this invention is not limited to data shifting by the double/single shift widths having those numbers of bits.

Also, shift width combinations need not comprise single and double shift widths. Instead, the enlarged shift width can be on n times the original data width of a word in a CPU.

Furthermore, this invention may be applied to not only a single dimensional data shift but also a multi-dimensional data shift mutatis mutandis.

Thus, this invention is effective in realizing a data shifting circuit of a central processing unit capable of rotate-shifting data both by a single shift width and by a double shift width, without a significantly larger hardware volume or incurring any data delay.

What is claimed is

1. A data shifting circuit comprising:

barrel shifter means for shifting, by a plurality of bits, first data which has a width twice that of an original data width, said barrel shifter means having high order bits and low order bits, said original data width having a specified number of bits, and said high order bits and said low order bits each being the specified number of bits;

register group means having a plurality of registers for storing register data, each register having respective outputs, each respective output supplying respective register output; and data controller means for selecting as second data, a first register output from a first register of the plurality of registers commonly supplied to the high order bits and the low order bits of said barrel shifter means, in response to a request for shifting data of said original data width, and for selecting a second register output from a second register of the plurality of registers and a third register output from a third register of the plurality of registers when a double bit data width shift request signal is input to select said second register, said third register having a selected relationship with said second register, the selected relationship being defined when said double bit width shift request signal is input, and for supplying said second register output and said third register output, as bit data, to said barrel shifter means, in response to said double bit data width request signal.

2. The data shifting circuit as set forth in claim 1, wherein:

said barrel shifter means comprises a plurality of selectors for receiving said bit data having a width twice that of said original data width; and each of said selectors selects one bit of said bit data received, based on a shift width, the number of said plurality of selectors being two times the number of data bits of said original data width.

3. A data shifting circuit for use in a central processing unit having at least two registers, each register having respective outputs, and an arithmetic and logical unit, said arithmetic and logical unit receiving the respective outputs from each of said two registers, said data shifting circuit comprising:

barrel shifter means for shifting first data formed successively, in a double width, from said respective outputs of said at least two registers, each respective output from each of said two registers having an original data width, said original data width being a specified number of bits, and said double width being twice that of said original data width, said barrel shifter means having high order bits and low order bits, said high order bits and said low order bits each being said specified number of bits; and controller means for supplying second data of said original data width, stored in one of said at least two registers, to said barrel shifter means, commonly to the high order bits and the low order bits, in response to a shift instruction instructing a shift by said original data width.

4. The data shifting circuit as set forth in claim 3, wherein:

said barrel shifter means comprises a plurality of selectors for receiving bit data having a width twice that of said original data width; and each of said selectors selects one bit of said bit data based on a shift width, the number of said selectors being two times the number of data bits in said original data width.

\* \* \* \* \*